United States Patent
Matsuda et al.

(10) Patent No.: US 12,410,975 B2
(45) Date of Patent: Sep. 9, 2025

(54) HEAT TREATMENT VESSEL COUPLER, HEAT TREATMENT VESSEL COUPLING METHOD, AND HEAT TREATMENT METHOD

(71) Applicant: NORITAKE CO., LIMITED, Nagoya (JP)

(72) Inventors: Kenji Matsuda, Nagoya (JP); Kenji Matsunaga, Nagoya (JP); Yoshihiro Sekikawa, Nagoya (JP); Kazuhiro Onoda, Nagoya (JP)

(73) Assignee: NORITAKE CO., LIMITED, Nagoya (JP)

( * ) Notice: Subject to any disclaimer, the term of this patent is extended or adjusted under 35 U.S.C. 154(b) by 410 days.

(21) Appl. No.: 18/028,289

(22) PCT Filed: Sep. 24, 2021

(86) PCT No.: PCT/JP2021/035127
§ 371 (c)(1),
(2) Date: Mar. 24, 2023

(87) PCT Pub. No.: WO2022/065438
PCT Pub. Date: Mar. 31, 2022

(65) Prior Publication Data
US 2023/0408198 A1    Dec. 21, 2023

(30) Foreign Application Priority Data

Sep. 24, 2020 (JP) ................................ 2020-160234
Apr. 19, 2021 (JP) ................................ 2021-070708

(51) Int. Cl.
*F27D 3/12* (2006.01)
*F27B 9/26* (2006.01)
(52) U.S. Cl.
CPC . *F27B 9/26* (2013.01); *F27D 3/12* (2013.01)

(58) Field of Classification Search
CPC ... F27B 9/26; F27D 3/12; F27D 3/123; F27D 5/0031; F27D 5/0012; F27D 5/0006; C21D 9/0025
See application file for complete search history.

(56) References Cited

U.S. PATENT DOCUMENTS

| 1,384,468 | A | * | 7/1921 | Howell | ................ | F27D 5/0018 |
| | | | | | | 432/259 |
| 4,315,737 | A | | 2/1982 | Elliott et al. | | |
| 2014/0178827 | A1 | * | 6/2014 | Na | ........................ | F27D 5/0068 |
| | | | | | | 432/261 |

FOREIGN PATENT DOCUMENTS

| CN | 105509465 A | * | 4/2016 | ............ F27B 9/2407 |
| DE | 1 258 551 B | | 1/1968 | |

(Continued)

OTHER PUBLICATIONS

Nov. 2, 2021 Written Opinion issued in International Patent Application No. PCT/JP2021/035127.

(Continued)

*Primary Examiner* — Gregory A Wilson
(74) *Attorney, Agent, or Firm* — Oliff PLC

(57) ABSTRACT

A heat treatment vessel coupler for coupling together heat treatment vessels adjacent in a horizontal direction, of a plurality of rectangular box-shaped heat treatment vessels each loaded with a material to be treated, conveyed in a conveying direction on a plurality of rotationally driven conveyor rollers arranged in parallel inside a heat treatment furnace, the coupler comprises a plate body smaller than each of the heat treatment vessels, at least a pair of engagement protrusions each projecting from the plate body and engaging with a corresponding one of side walls of the heat treatment vessels, and a spacer protrusion projecting from the plate body between the at least a pair of engagement protrusions so as to be sandwiched between the heat treat- (Continued)

ment vessels with which the at least a pair of engagement protrusions engage respectively.

13 Claims, 14 Drawing Sheets

(56) References Cited

FOREIGN PATENT DOCUMENTS

| DE | 296 09 382 U1 | 8/1996 | | |
|---|---|---|---|---|
| JP | S43-7173 Y1 | 3/1968 | | |
| JP | S60-35190 U | 3/1985 | | |
| JP | S61-43198 Y2 | 12/1986 | | |
| JP | H01-98890 A | 4/1989 | | |
| JP | H11-201658 A | 7/1999 | | |
| JP | 2000-111268 A | 4/2000 | | |
| JP | 2003201182 A * | 7/2003 | | |
| JP | 5063845 B2 * | 10/2012 | ............. | C21D 9/025 |
| JP | 2014-122783 A | 7/2014 | | |
| JP | 6913804 B1 * | 8/2021 | | |
| JP | 7089621 B1 * | 6/2022 | | |
| KR | 101402539 B1 * | 5/2014 | ............. | H01M 4/04 |
| WO | WO-2020260158 A1 * | 12/2020 | ............. | B28B 7/342 |
| WO | WO-2024123082 A1 * | 6/2024 | ........... | F27D 5/0068 |

OTHER PUBLICATIONS

Nov. 2, 2021 International Search Report issued in International Patent Application No. PCT/JP2021/035127.

Aug. 17, 2021 Office Action issued in Japanese Patent Application No. 2021-070708.

Aug. 14, 2024 extended Search Report issued in European Patent Application No. 21872567.9.

* cited by examiner

HEAT TREATMENT VESSEL COUPLER, HEAT TREATMENT VESSEL COUPLING METHOD, AND HEAT TREATMENT METHOD

TECHNICAL FIELD

The present invention relates to a heat treatment vessel coupler for coupling together rectangular box-shaped heat treatment vessels conveyed in one direction on a plurality of conveyor rollers arranged within a heat treatment furnace, and relates to a technique restricting deterioration in circulation of atmosphere within the heat treatment furnace while suppressing meandering of the heat treatment vessels and variability in progress of the heat treatment vessels.

BACKGROUND ART

A rectangular box-shaped heat treatment vessel is well known that is conveyed in a conveying direction, with a material to be treated mounted thereon, on a plurality of rotationally driven conveyor rollers arranged in parallel inside a heat treatment furnace. An example thereof is a heat treatment vessel described in Patent Document 1. Though not the heat treatment vessel, a coupler is well known that couples flat plate-shaped heat treatment setters together. An example thereof is a coupler depicted in FIGS. 6 to 10 of Patent Document 2. In Patent Document 2, the front and rear treatment setters are coupled together in contact with each other without any gap therebetween, so that relative displacement between the heat treatment setters is constrained to suppress meandering of the heat treatment setters.

By applying the coupler technique of Patent Document 2 to the heat treatment vessel of Patent Document 1, a heat treatment vessel coupler may be conceivable that couples the front and rear heat treatment vessels in contact with each other without any gap therebetween. However, the heat treatment vessel coupler described above involves problems, due to the gap-free contact between the heat treatment vessels, that the front and rear heat treatment vessels become difficult to be separated from each other after heat treatment and that atmospheric circulation becomes poor between above and below the heat treatment vessels within a heat treatment furnace in operation, resulting in, for example, deterioration of the treating efficiency to treat the material to be treated by heat.

As described in Patent Document 3, a type is known where a plurality of products to be fired are arranged in a direction orthogonal to a conveying direction, the products to be fired being conveyed on a plurality of rotationally driven conveyor rollers arranged in parallel inside a heat treatment furnace. This Patent Document 3 entails a problem, for example, that since the conveyor rollers bend downward at their central portions due to their own weights and loads of the products to be fired, the products to be fired lying at central portions of the conveyor rollers, of the products to be fired conveyed in the conveying direction, are delayed in progress with respect to the products to be fired lying on both end sides of the conveyor rollers, hindering automatic unloading at the furnace outlet. Though it is also conceivable in Patent Document 3 to use rectangular box-shaped heat treatment vessels instead of the products to be fired, the same problem as the above arises that the heat treatment vessels at central portions are delayed in progress with respect to the heat treatment vessels at both end sides, i.e., a problem arises that the heat treatment vessels progress differently. Difference in progress between the heat treatment vessels leads to, for example, extension of time during which a shutter disposed at the outlet of the heat treatment furnace is opened, causing e.g. another problem of increased inflow of external air into the heat treatment furnace.

PRIOR ART DOCUMENTS

Patent Documents

Patent Document 1: JP2014122783A
Patent Document 2: JP2000111268A
Patent Document 3: JPS6143198Y2
Patent Document 4: JPS437173Y1

SUMMARY OF THE INVENTION

Problem to be Solved by the Invention

On the other hand, a heat treatment vessel coupler as described in Patent Document 4 is known. The heat treatment vessel coupler of Patent Document 4 is a lid-like coupler that couples adjacent rectangular box-shaped heat treatment vessels together and closes openings of the adjacent heat treatment vessels. Therefore, if the lid-like coupler is used for the heat treatment vessels adjacent in the direction orthogonal to the conveying direction, the relative displacement between the adjacent heat treatment vessels is constrained by the lid-like coupler so that the variability in progress of the heat treatment vessels can be suppressed. However, the lid-like coupler as described above not only closes the openings of the adjacent heat treatment vessels but also closes the space defined between the adjacent heat treatment vessels, which deteriorate the atmospheric circulation between above and below the heat treatment vessels, resulting in e.g. a problem of deterioration in treatment efficiency to treat the material to be treated by heat.

The present invention was conceived against a background of the above circumstances and its object is to provide a heat treatment vessel coupler capable of easily separating heat treatment vessels after heat treatment and suppressing deterioration in atmospheric circulation within a heat treatment furnace, while restricting meandering of the heat treatment vessels or variability in progress between the heat treatment vessels.

According to a first aspect of the invention, (a) there is provided a heat treatment vessel coupler for coupling together heat treatment vessels adjacent in a horizontal direction, of a plurality of rectangular box-shaped heat treatment vessels each loaded with a material to be treated, conveyed in a conveying direction on a plurality of rotationally driven conveyor rollers arranged in parallel inside a heat treatment furnace, the coupler comprises (b) a plate body smaller than each of the heat treatment vessels, (c) at least a pair of engagement protrusions each projecting from the plate body and engaging with a corresponding one of side walls of the heat treatment vessels, and (d) a spacer protrusion projecting from the plate body between the at least a pair of engagement protrusions so as to be sandwiched between the heat treatment vessels with which the at least a pair of engagement protrusions engage respectively.

According to a second aspect of the invention, in the heat treatment vessel coupler according to the first aspect of the invention, (a) the coupler couples mutually the heat treatment vessels adjacent in the conveying direction, of the plurality of rectangular box-shaped heat treatment vessels or couples mutually the heat treatment vessels adjacent in the conveying direction and mutually the heat treatment vessels adjacent in a direction orthogonal to the conveying direction, (b) the at least a pair of engagement protrusions each engage with a corresponding one of corners defined between side walls of the heat treatment vessels, and (c) the spacer protrusion projects from the plate body between the at least a pair of engagement protrusions so as to be sandwiched between the corners defined between side walls of the heat treatment vessels with which the at least a pair of engagement protrusions engage respectively.

According to a third aspect of the invention, in the heat treatment vessel coupler according to the second aspect of the invention, (a) the at least a pair of engagement protrusions include a total of four engagement protrusions, i.e., a pair of engagement protrusions each engaging with a corresponding one of corners defined between side walls of a pair of heat treatment vessels adjacent in the conveying direction and a pair of engagement protrusions each engaging with a corresponding one of corners defined between side walls of a pair of heat treatment vessels adjacent in a direction orthogonal to the conveying direction, and (b) the spacer protrusion projects from the plate body between the four engagement protrusions so as to be sandwiched between the pair of heat treatment vessels adjacent in the conveying direction and between the pair of heat treatment vessels adjacent in the direction orthogonal to the conveying direction.

According to a fourth aspect of the invention, in the heat treatment vessel coupler according to the third aspect of the invention, the spacer protrusion comprises a conveying-direction gap forming portion intervening between heat treatment vessels adjacent in the conveying direction to form a gap therebetween; and an orthogonal-direction gap forming portion intervening between heat treatment vessels adjacent in a direction orthogonal to the conveying direction to form a gap therebetween.

According to a fifth aspect of the invention, in the heat treatment vessel coupler according to the fourth aspect of the invention, (a) the conveying-direction gap forming portion is elongated in a direction orthogonal to the conveying direction, (b) the orthogonal-direction gap forming portion is elongated in the conveying direction, and (c) the spacer protrusion is a protrusion including the conveying-direction gap forming portion and the orthogonal-direction gap forming portion that intersect each other at right angles.

According to a sixth aspect of the invention, in the heat treatment vessel coupler according to the second aspect of the invention, (a) the at least a pair of engagement protrusions include two engagement protrusions each engaging with a corresponding one of corners defined between side walls of a pair of heat treatment vessels adjacent in the conveying direction, (b) the spacer protrusion projects from the plate body between the two engagement protrusions so as to be sandwiched between the pair of heat treatment vessels adjacent in the conveying direction.

According to a seventh aspect of the invention, in the heat treatment vessel coupler according to the first aspect of the invention, (a) the coupler couples mutually heat treatment vessels adjacent in a direction orthogonal to the conveying direction, of the rectangular box-shaped heat treatment vessels, (b) the pair of engagement protrusions project integrally from the plate body and engage respectively with one side wall, lying toward a heat treatment vessel on the other hand, of side walls of a heat treatment vessel on one hand, of the heat treatment vessels adjacent in the orthogonal direction and with the other side wall, facing the one side wall, of side walls of a heat treatment vessel on the other hand, of the heat treatment vessels adjacent in the orthogonal direction, and (c) the spacer protrusion project from the plate body between the pair of engagement protrusions so as to be sandwiched between the one side wall and the other side wall.

According to an eighth aspect of the invention, in the heat treatment vessel coupler according to the seventh aspect of the invention, the pair of engagement protrusions and the spacer protrusion are elongated in the conveying direction and are parallel to one another.

According to a ninth aspect of the invention, in the heat treatment vessel coupler according to the seventh or eighth aspects of the invention, the pair of engagement protrusions engage with an end of the one side wall and an end of the other side wall, respectively.

According to a tenth aspect of the invention, in the heat treatment vessel coupler according to the seventh or eighth aspects of the invention, in a state where the coupler couples adjacent vessels together, the plate body is an elongated plate extending along the one side wall and the other side wall, one of the pair of engagement protrusions being a longitudinal protrusion projecting from a side edge, lying toward the heat treatment vessel on one hand, of the elongated plate, so as to face the one side wall, the other of the pair of engagement protrusions being a longitudinal protrusion projecting from a side edge, lying toward the heat treatment vessel on the other hand, of the elongated plate, so as to face the other side wall.

According to a eleventh aspect of the invention, in the heat treatment vessel coupler according to the ninth aspect of the invention, a misalignment prevention protrusion projecting on the plate body from a side edge not having the pair of engagement protrusions, of both side edges of the plate body, to a direction identical to a direction of projection of the pair of engagement protrusions, the misalignment prevention protrusion being positioned, with intervals greater than a thickness of the side walls of the heat treatment vessel, between the pair of engagement protrusions.

According to a twelfth aspect of the invention, (a) a heat treatment vessel coupling method of coupling mutually, by use of a coupler, heat treatment vessels adjacent in a conveying direction or heat treatment vessels adjacent in an orthogonal direction orthogonal to the conveying direction, of rectangular box-shaped heat treatment vessels each loaded with a material to be treated, conveyed on a plurality of rotationally driven conveyor rollers arranged in parallel inside a heat treatment furnace, (b) the coupler comprises (b1) a plate body smaller than each of the heat treatment vessels, (b2) a pair of engagement protrusions projecting integrally from the plate body and engaging respectively with one side wall, lying toward a heat treatment vessel on the other hand, of side walls of a heat treatment vessel on one hand, of heat treatment vessels adjacent in the conveying direction or the orthogonal direction and with the other side wall, facing the one side wall, of side walls of the heat treatment vessel on the other hand, of the heat treatment vessels adjacent in the conveying direction or the orthogonal direction, and (b3) a spacer protrusion projecting from the plate body between the pair of engagement protrusions so as to be sandwiched between the one side wall and the other side wall.

According to a thirteenth aspect of the invention, (a) a heat treatment method using a heat treatment vessel coupler, the coupler coupling mutually, heat treatment vessels adjacent in a conveying direction of the heat treatment vessels or heat treatment vessels adjacent in an orthogonal direction orthogonal to the conveying direction, of rectangular box-shaped heat treatment vessels each loaded with a material to be treated, conveyed on a plurality of rotationally driven conveyor rollers arranged in parallel inside a heat treatment furnace, (b) the coupler comprises (b1) a plate body smaller than each of the heat treatment vessels; (b2) a pair of engagement protrusions projecting integrally from the plate body and engaging respectively with one side wall, lying toward a heat treatment vessel on the other hand, of side walls of a heat treatment vessel on one hand, of heat treatment vessels adjacent in the conveying direction or the orthogonal direction and with the other side wall, facing the one side wall, of side walls of the heat treatment vessel on the other hand, of the heat treatment vessels adjacent in the conveying direction or the orthogonal direction, and (b3) a spacer protrusion projecting from the plate body between the pair of engagement protrusions so as to be sandwiched between the one side wall and the other side wall.

According to the first aspect of the invention, the coupler includes (b) a plate body smaller than each of the heat treatment vessels, (c) a pair of engagement protrusions projecting integrally from the plate body and engaging respectively with one side wall, and (d) a spacer protrusion projecting from the plate body between the pair of engagement protrusions so as to be sandwiched between the one side wall and the other side wall. Consequently, during the conveyance, engagement of the pair of engagement protrusions of the coupler restricts mutual displacement of the heat treatment vessels between the heat treatment vessels adjacent in the conveying direction or between the heat treatment vessels adjacent in the direction orthogonal to the conveying direction, thereby enabling suppression of meandering of the heat treatment vessels or suppression of variability in progress between the heat treatment vessels. By sandwiching the spacer protrusion between the heat treatment vessels, the close proximity is restricted between the heat treatment vessels so that the heat treatment vessels are conveyed inside the heat treatment furnace, with the gap formed between the heat treatment vessels, thereby facilitating separation of the heat treatment vessels from each other after heat treatment and achieving suppression of deterioration in the atmospheric circulation within the heat treatment furnace.

According to the second aspect of the invention, (a) the coupler couples mutually the heat treatment vessels adjacent in the conveying direction, of the plurality of rectangular box-shaped heat treatment vessels or couples mutually the heat treatment vessels adjacent in the conveying direction and mutually the heat treatment vessels adjacent in a direction orthogonal to the conveying direction, (b) the at least a pair of engagement protrusions each engage with a corresponding one of corners defined between side walls of the heat treatment vessels, and (c) the spacer protrusion projects from the plate body between the at least a pair of engagement protrusions so as to be sandwiched between the corners defined between side walls of the heat treatment vessels with which the at least a pair of engagement protrusions engage respectively. As a result, the same effect as in the first invention can be obtained in coupling mutually the heat treatment vessels adjacent in the conveying direction or in coupling mutually the heat treatment vessels adjacent in the conveying direction and mutually the heat treatment vessels adjacent in the direction orthogonal to the conveying direction. The at least a pair of engagement protrusions engage with corners of side walls of the heat treatment vessels. Since the corners of side walls of the heat treatment vessels have a high strength, the durability of the heat treatment vessels increases.

According to the third aspect of the invention, (a) the at least a pair of engagement protrusions include a total of four engagement protrusions, i.e., a pair of engagement protrusions each engaging with a corresponding one of corners defined between side walls of a pair of heat treatment vessels adjacent in the conveying direction and a pair of engagement protrusions each engaging with a corresponding one of corners defined between side walls of a pair of heat treatment vessels adjacent in a direction orthogonal to the conveying direction, and (b) the spacer protrusion projects from the plate body between the four engagement protrusions so as to be sandwiched between the pair of heat treatment vessels adjacent in the conveying direction and between the pair of heat treatment vessels adjacent in the direction orthogonal to the conveying direction. Consequently, mutual displacement of the heat treatment vessels between the heat treatment vessels adjacent in the conveying direction or between the heat treatment vessels adjacent in the direction orthogonal to the conveying direction, thereby enabling suppression of meandering of the heat treatment vessels by the single coupler.

According to the fourth aspect of the invention, the spacer protrusion comprises a conveying-direction gap forming portion intervening between heat treatment vessels adjacent in the conveying direction to form a gap therebetween; and an orthogonal-direction gap forming portion intervening between heat treatment vessels adjacent in a direction orthogonal to the conveying direction to form a gap therebetween. Consequently, the close proximity is restricted between the heat treatment vessels so that the heat treatment vessels are conveyed inside the heat treatment furnace, with the gap formed between the heat treatment vessels.

According to the fifth aspect of the invention, (a) the conveying-direction gap forming portion is elongated in a direction orthogonal to the conveying direction, (b) the orthogonal-direction gap forming portion is elongated in the conveying direction, and (c) the spacer protrusion is a protrusion including the conveying-direction gap forming portion and the orthogonal-direction gap forming portion that intersect each other at right angles. Consequently, the close proximity is restricted between the heat treatment vessels, so that the heat treatment vessels are conveyed inside the heat treatment furnace, with the gap formed between the heat treatment vessels.

According to a sixth aspect of the invention, (a) the at least a pair of engagement protrusions include two engagement protrusions each engaging with a corresponding one of corners defined between side walls of a pair of heat treatment vessels adjacent in the conveying direction, (b) the spacer protrusion projects from the plate body between the two engagement protrusions so as to be sandwiched between the pair of heat treatment vessels adjacent in the conveying direction. Consequently, mutual displacement of the heat treatment vessels between the heat treatment vessels adjacent in the conveying direction the close proximity is restricted between the heat treatment vessel, so that the heat treatment vessels are conveyed inside the heat treatment furnace, with the gap formed between the heat treatment vessels.

According to the seventh aspect of the invention, (a) the coupler couples mutually heat treatment vessels adjacent in a direction orthogonal to the conveying direction, of the rectangular box-shaped heat treatment vessels, (b) the pair of engagement protrusions project integrally from the plate body and engage respectively with one side wall, lying toward a heat treatment vessel on the other hand, of side walls of a heat treatment vessel on one hand, of the heat treatment vessels adjacent in the orthogonal direction and with the other side wall, facing the one side wall, of side walls of a heat treatment vessel on the other hand, of the heat treatment vessels adjacent in the orthogonal direction, and (c) the spacer protrusion project from the plate body between the pair of engagement protrusions so as to be sandwiched between the one side wall and the other side wall. Hence, if the heat treatment vessels are each about to progress differently, the one side wall of the heat treatment vessel on one hand or the other side wall of the heat treatment vessel on the other engage with a corresponding one of the pair of engagement protrusions so that the mutual displacement is restricted, thus enabling suppression of variability in progress between the heat treatment vessels. By sandwiching the spacer protrusion between the one side wall of the heat treatment vessel on one hand and the other side wall of the heat treatment vessel on the other, the close proximity is restricted between the heat treatment vessel on one hand and the heat treatment vessel on the other, so that the heat treatment vessels are conveyed inside the heat treatment furnace, with the gap formed between the heat treatment vessel on one hand and the heat treatment vessel on the other that are adjacent to each other, thereby achieving suppression of deterioration in the atmospheric circulation within the heat treatment furnace.

According to the eighth aspect of the invention, the pair of engagement protrusions and the spacer protrusion are elongated in the conveying direction and are parallel to one another. Consequently, by the elongate spacer protrusion, the close proximity is restricted between the heat treatment vessels.

According to the ninth aspect of the invention, the pair of engagement protrusions engage with an end of the one side wall and an end of the other side wall, respectively. Consequently, by the elongate spacer protrusion, the close proximity is restricted between the heat treatment vessels. For this reason, if the heat treatment vessels are each about to progress differently, the corner of the heat treatment vessel comes into abutment against a corresponding one of the pair of engagement protrusions, so that mutual displacement can properly be restricted between the heat treatment vessels adjacent in the orthogonal direction.

According to the tenth aspect of the invention, (a) in a state where the coupler couples adjacent vessels together, (b) the plate body is an elongated plate extending along the one side wall and the other side wall, (c) one of the pair of engagement protrusions being a longitudinal protrusion projecting from a side edge, lying toward the heat treatment vessel on one hand, of the elongated plate, so as to face the one side wall, (d) the other of the pair of engagement protrusions being a longitudinal protrusion projecting from a side edge, lying toward the heat treatment vessel on the other hand, of the elongated plate, so as to face the other side wall. For this reason, if the heat treatment vessels adjacent in the orthogonal direction are mutually displaced, the corner of the heat treatment vessel comes into abutment against a corresponding one of the pair of engagement protrusions, so that mutual displacement can properly be restricted between the heat treatment vessels adjacent in the orthogonal direction.

According to the eleventh aspect of the invention, the coupler comprises a misalignment prevention protrusion projecting on the plate body from a side edge not having the pair of engagement protrusions, of both side edges of the plate body, to a direction identical to a direction of projection of the pair of engagement protrusions. The misalignment prevention protrusion is positioned, with intervals greater than a thickness of the side walls of the heat treatment vessel, between the pair of engagement protrusions. Hence, the misalignment prevention protrusion can prevent misalignment of the couplers by sandwiching the side walls of the heat treatment vessels between the misalignment prevention protrusion and the pair of engagement protrusions.

According to the twelfth aspect of the invention, heat treatment vessels adjacent in a conveying direction or heat treatment vessels adjacent in an orthogonal direction orthogonal to the conveying direction are coupled together by use of a coupler including (a) a plate body smaller than each of the heat treatment vessels, (b) a pair of engagement protrusions projecting integrally from the plate body and engaging respectively with one side wall, lying toward a heat treatment vessel on the other hand, of side walls of a heat treatment vessel on one hand, of heat treatment vessels adjacent in the conveying direction or the orthogonal direction and with the other side wall, facing the one side wall, of side walls of the heat treatment vessel on the other hand, of the heat treatment vessels adjacent in the conveying direction or the orthogonal direction, and (c) a spacer protrusion projecting from the plate body between the pair of engagement protrusions so as to be sandwiched between the one side wall and the other side wall. Consequently, during the conveyance, engagement of the pair of engagement protrusions of the coupler restricts mutual displacement of the heat treatment vessels between the heat treatment vessels adjacent in the conveying direction or between the heat treatment vessels adjacent in the direction orthogonal to the conveying direction, thereby enabling suppression of meandering of the heat treatment vessels or suppression of variability in progress between the heat treatment vessels. By sandwiching the spacer protrusion between the heat treatment vessels, the close proximity is restricted between the heat treatment vessels, so that the heat treatment vessels are conveyed inside the heat treatment furnace, with the gap formed between the heat treatment vessels, thereby facilitating separation of the heat treatment vessels from each other after heat treatment and achieving suppression of deterioration in the atmospheric circulation within the heat treatment furnace.

According to a heat treatment method of the thirteenth aspect of the invention, heat treatment is performed in the state where the heat treatment vessels adjacent in the conveying direction of the heat treatment vessels or the heat treatment vessels adjacent in the orthogonal direction orthogonal to the conveying direction are coupled together by a heat treatment vessel coupler including (a) a plate body smaller than each of the heat treatment vessels, (b) a pair of engagement protrusions projecting integrally from the plate body and engaging respectively with one side wall, lying toward a heat treatment vessel on the other hand, of side walls of a heat treatment vessel on one hand, of heat treatment vessels adjacent in the conveying direction or the orthogonal direction and with the other side wall, facing the one side wall, of side walls of the heat treatment vessel on the other hand, of the heat treatment vessels adjacent in the conveying direction or the orthogonal direction, and (c) a spacer protrusion projecting from the plate body between the pair of engagement protrusions so as to be sandwiched between the one side wall and the other side wall. In consequence, during the conveyance of the heat treatment vessels, engagement of the pair of engagement protrusions of the coupler restricts mutual displacement of the heat treatment vessels between the heat treatment vessels adjacent in the conveying direction or between the heat treatment vessels adjacent in the direction orthogonal to the conveying direction, thereby enabling suppression of meandering of the heat treatment vessels or suppression of variability in progress between the heat treatment vessels. By sandwiching the spacer protrusion between the heat treatment vessels, the close proximity is restricted between the heat treatment vessels, so that the heat treatment vessels are conveyed inside the heat treatment furnace, with the gap formed between the heat treatment vessels, thereby facilitating separation of the heat treatment vessels from each other after heat treatment and achieving suppression of deterioration in the atmospheric circulation within the heat treatment furnace.

MODES FOR CARRYING OUT THE INVENTION

Embodiments of the present invention will hereinafter be described in detail with reference to the drawings. In the following embodiments, the figures are simplified or modified appropriately, and the dimension ratios, shapes, etc. of parts are not necessarily correctly drawn.

First Embodiment

Figure 1:
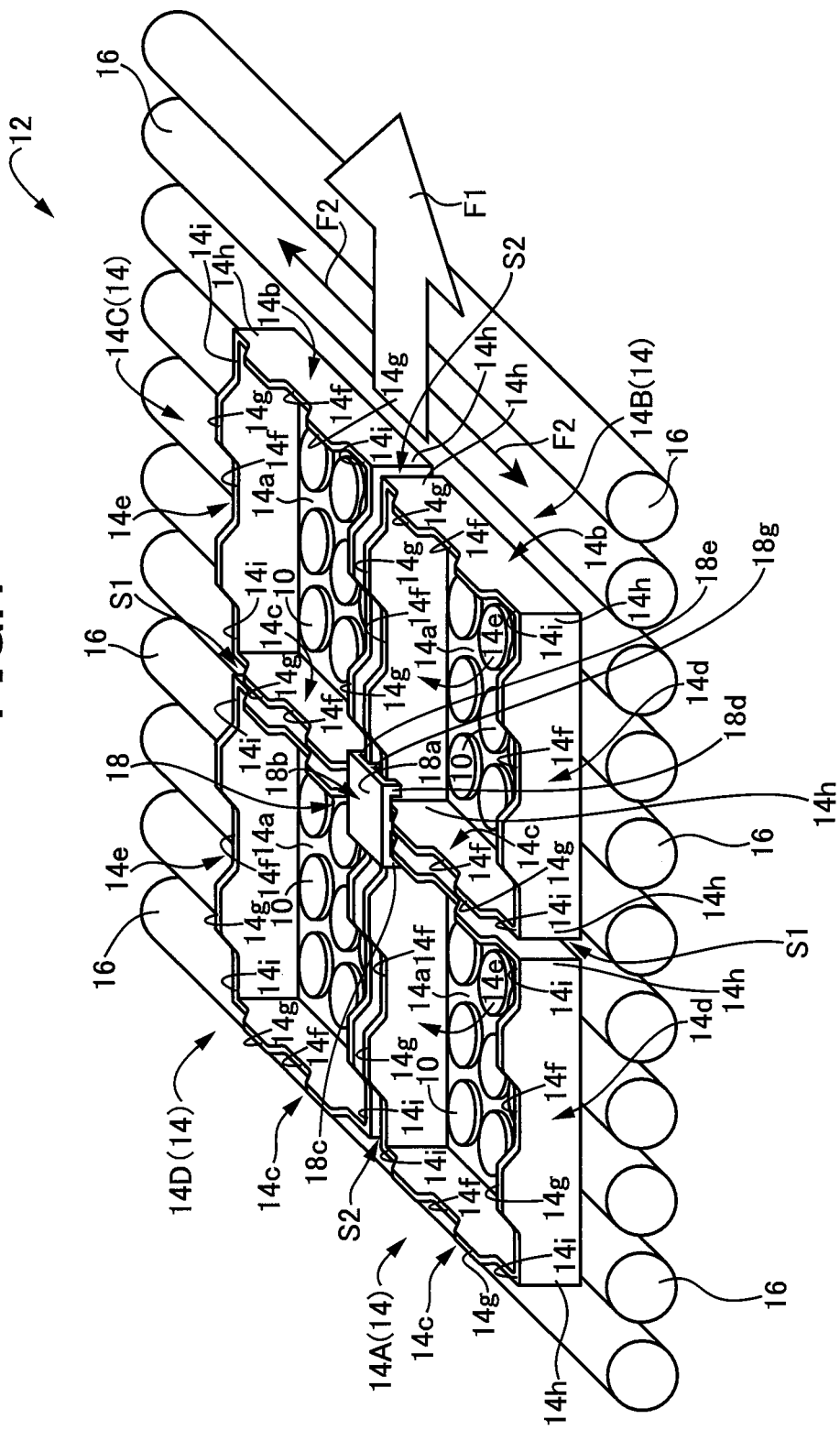
FIG. 1 is a perspective view explaining a schematic configuration of a continuous conveyor type heat treatment furnace to which the present invention is properly applied.

FIG. 1 is a perspective view explaining a schematic configuration of a continuous conveyor type heat treatment furnace 12 to which the present invention is properly applied. The heat treatment furnace 12 is a roller hearth kiln that includes a plurality of conveyor rollers 16 to convey heat treatment vessels 14 continuously and rectilinearly and that performs heat treatment of a powder-like or pellet-like material to be treated accommodated or placed within the heat treatment vessels 14 at a specified temperature under a predetermined in-furnace atmosphere, e.g., an inert gas atmosphere. The conveyor rollers 16 are each a sintered body of a heat-resistant inorganic material such as $Al_2O_3$ or SiC. The heat treatment furnace 12 includes, as shown in FIG. 1: the plurality of conveyor rollers 16 each having a cylindrical shape with the same diameter, horizontally arranged in parallel and at equal intervals inside the heat treatment furnace 12; and a driving device (not shown) rotationally driving the conveyor rollers 16 in synchronism with one another. The heat treatment furnace 12 is configured such that the heat treatment vessels 14 arranged on the conveyor rollers 16 are conveyed in a horizontal direction i.e. a conveying direction F1. The material to be treated 10 is for example a battery material, and is preferably an all-solid-state battery electrode material or a lithium-ion battery electrode material.

For example, inside the heat treatment furnace 1, as shown in FIG. 1, the heat treatment vessels 14 are conveyed by fours in the conveying direction F1, each four heat treatment vessels 14 being coupled together in the conveying direction F1 and an orthogonal direction F2 by a coupler 18. The four heat treatment vessels 14 shown in FIG. 1 are each of the same shape i.e. a rectangular box shape and are each formed of a sintered body obtained by: integrally molding a heat-resistant inorganic material by e.g. pressing; and then sintering the mold. Examples of the heat-resistant inorganic material include mullite-cordierite, mullite, cordierite, alumina, spinel, SiC, and aluminum titanate. Since the coupler 18 is also formed of e.g. the sintered body of the heat-resistant inorganic material, a large frictional resistance occurs between the coupler 18 and the heat treatment vessels 14. The orthogonal direction F2 is the longitudinal direction of the conveyor rollers 16 and is parallel to axes of the conveyor rollers 16, with the conveying direction F1 being orthogonal to the axes of the conveyor rollers 16.

Figure 2:
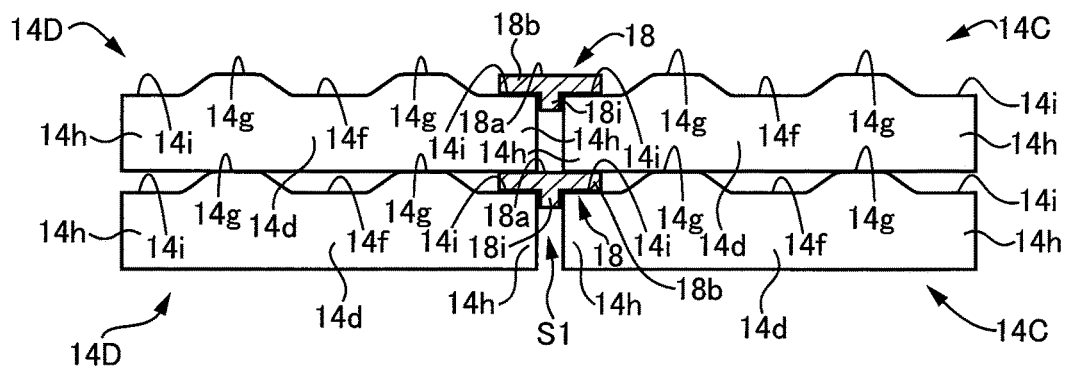
FIG. 2 is a view showing the state where the heat treatment vessels coupled together by the coupler as shown in FIG. 1 are stacked in e.g. two layers.

The four heat treatment vessels 14 each integrally include, as shown in FIG. 1: a square bottom wall 14a; a front wall (side wall) 14b vertically extending from the bottom wall 14a at its front end in the conveying direction F1; a rear wall (side wall) 14c vertically extending from the bottom wall 14a at its rear end in the conveying direction F1; a right wall (side wall) 14d vertically extending from the bottom wall 14a at its right end in the conveying direction F1; and a left wall (side wall) 14e vertically extending from the bottom wall 14a at its left end in the conveying direction F1. As shown in FIG. 1, the front wall 14b, the rear wall 14c, the right wall 14d, and the left wall 14e each having the same thickness each include a notch 14f through which gas generated from the material to be treated 10 as a result of heat treatment is discharged from the interior of the heat treatment vessel 14 in the case where the heat treatment vessel 14 is multi-tiered (two-tiered in FIG. 2) as shown in FIG. 2. The front wall 14b, the rear wall 14c, the right wall 14d, and the left wall 14e have their respective top faces 14g that are formed in the same plane. The top faces 14g of the front wall 14b, rear wall 14c, right wall 14d, and left wall 14e are each parallel to the bottom wall 14a. The heat treatment vessel 14 has four corners 14h that are formed by the front wall 14b, rear wall 14c, right wall 14d, and left wall 14e, the four corners 14h having their respective notches 14i formed such that a top face 18a of the coupler 18 is level with the top faces 14g of the front wall 14b, rear wall 14c, right wall 14d, and left wall 14e as shown in FIG. 2, or such that the top face 18a of the coupler 18 lies closer to the bottom wall 14a than the top faces 14g of the front wall 14b, rear wall 14c, right wall 14d, and left wall 14e lie, in the case where the coupler 18 is assembled to the corners 14h of the heat treatment vessels 14. This enables the heat treatment vessels 14 coupled by the coupler 18 to be properly multi-tiered. FIG. 2 is a view showing the state where the heat treatment vessels 14 coupled together by the coupler 18 as shown in FIG. 1 are stacked in e.g. two layers.

The configuration of the coupler 18 will now be described with the four heat treatment vessels 14 of FIG. 1 identified as heat treatment vessels 14A to 14D. The heat treatment vessel 14A is the heat treatment vessel 14 arranged on the right side in the conveying direction F1, of the pair of heat treatment vessels 14 lying opposite to the conveying direction F, of the four heat treatment vessels 14. The heat treatment vessel 14B is the heat treatment vessel 14 adjacent to the heat treatment vessel 14A in the conveying direction F1. The heat treatment vessel 14C is the heat treatment vessel 14 adjacent to the heat treatment vessel 14B in the orthogonal direction F2 perpendicular to the conveying direction F1, i.e., the heat treatment vessel 14 arranged on the left side of the heat treatment vessel 14B in the conveying direction F1. The heat treatment vessel 14D is the heat treatment vessel 14 adjacent to the heat treatment vessel 14A in the orthogonal direction F2 perpendicular to the conveying direction F1, i.e., the heat treatment vessel 14 arranged on the left side of the heat treatment vessel 14A in the conveying direction F1.

Figure 3:
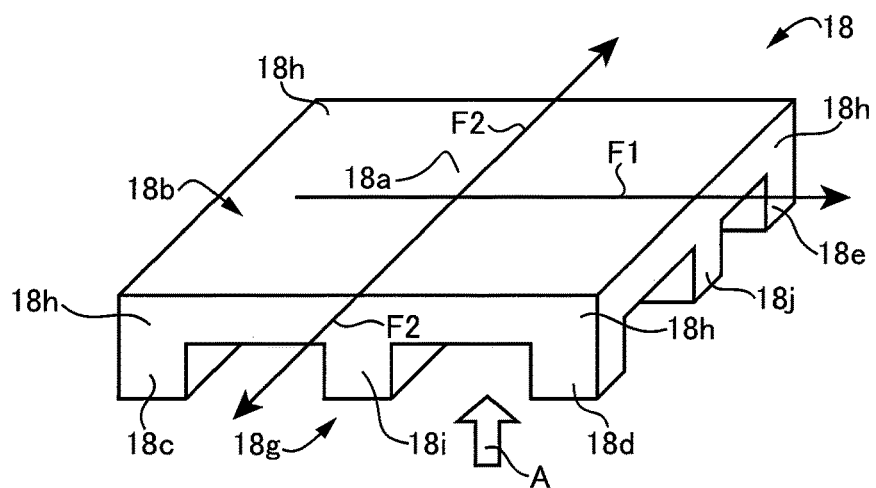
FIG. 3 is an enlarged view of the coupler shown in FIG. 1.
Figure 4:
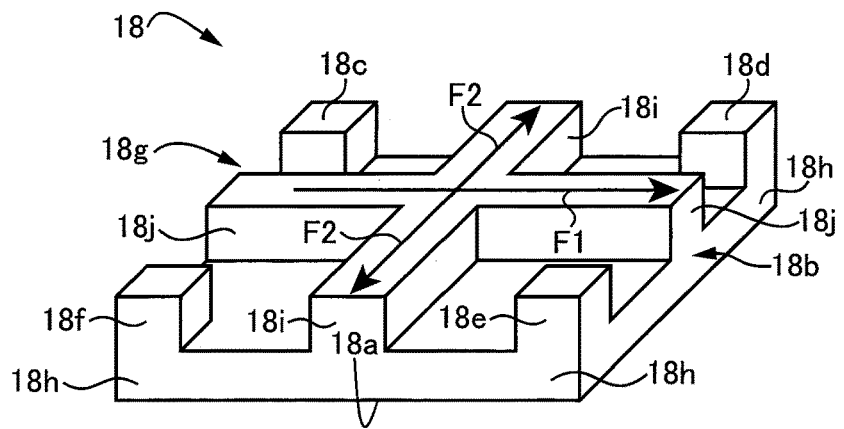
FIG. 4 is a view of the coupler 18 of FIG. 3, seen from the direction of arrow A.

The coupler 18 includes integrally, as shown in FIGS. 1, 3, and 4, a plate body 18b, a pair of first engagement protrusions (engagement protrusions) 18c and 18d, a pair of second engagement protrusions (engagement protrusions) 18e and 18f, and a spacer protrusion 18g. The plate body 18b is a plate member of e.g. a square shape, smaller in size than the bottom walls 14a of the heat treatment vessels 14A to 14D. The pair of first engagement protrusions 18c and 18d protrude prismatically from the plate body 18b at its two corners 18h so as to engage with the inner side of a corresponding one of the four corners 14h of the heat treatment vessel 14A and with the inner side of a corresponding one of the four corners 14h of the heat treatment vessel 14B. More specifically, the first engagement protrusion 18c engages with the inner side of the corner 14h between the front wall 14b and the left wall 14e of the heat treatment vessel 14A, while the first engagement protrusion 18d engages with the inner side of the corner 14h between the rear wall 14c and the left wall 14e of the heat treatment vessel 14B. The pair of second engagement protrusions 18e and 18f protrude prismatically from the plate body 18b at its remaining two corners 18h so as to engage with a corresponding one of the four corners 14h of the heat treatment vessel 14C and with a corresponding one of the four corners 14h of the heat treatment vessel 14D. More specifically, the second engagement protrusion 18e engages with the inner side of the corner 14h between the rear wall 14c and the right wall 14d of the heat treatment vessel 14C, while the second engagement protrusion 18f engages with the inner side of the corner 14h between the front wall 14b and the right wall 14d of the heat treatment vessel 14D. That is, the coupler 18 includes a total of four engagement protrusions, i.e., the pair of first engagement protrusions 18c and 18d and the pair of second engagement protrusions 18e and 18f, disposed protruding from the plate body 18b, the pair of first engagement protrusions 18c and 18d engaging with the inner side of the corners 14h of the pair of heat treatment vessels 14A and 14B adjacent in the conveying direction F1, the pair of second engagement protrusions 18e and 18f engaging with the inner side of the corners 14h of the pair of heat treatment vessels 14C and 14D adjacent to the pair of heat treatment vessels 14B and 14A, respectively, in the orthogonal direction F2 perpendicular to the conveying direction F1. FIG. 3 is an enlarged view of the coupler 18 shown in FIG. 1, and FIG. 4 is a view of the coupler 18 of FIG. 3, seen from the direction of arrow A.

The spacer protrusion 18g includes, as shown in FIG. 4, a conveying-direction gap forming portion 18i and an orthogonal-direction gap forming portion 18j. The conveying direction gap forming portion 18i extends between the first engagement protrusions 18c and 18d and the second engagement protrusions 18e and 18f in the conveying direction F1, to leave on its both sides a space greater than the wall thickness of the side walls 14b to 14e. The orthogonal-direction gap forming portion 18j extends between the first engagement protrusions 18c and 18d and the second engagement protrusions 18e and 18f in the orthogonal direction F2 to leave on its both sides a space greater than the wall thickness of the side walls 14b to 14e. As shown in FIG. 4, the conveying-direction gap forming portion 18i has an elongated shape extending prismatically in the orthogonal direction F2 perpendicular to the conveying direction F1, while the orthogonal-direction gap forming portion 18j has an elongated shape extending prismatically in the conveying direction F1. That is, the spacer protrusion 18g is a raised portion composed of the conveying-direction gap forming portion 18i and the orthogonal-direction gap forming portion 18j that intersect at right angles to form a plus (+) shape.

As shown in FIGS. 1, 3, and 4, the conveying-direction gap forming portion 18i protrudes from the plate body 18b between the pair of first engagement protrusions 18c and 18d and between the pair of second engagement protrusions 18e and 18f, so as to be sandwiched between the corners 14h of the pair of heat treatment vessels 14A and 14B adjacent in the conveying direction F1 and between the corners 14h of the pair of heat treatment vessels 14D and 14C adjacent to the pair of heat treatment vessels 14A and 14B, respectively, in the orthogonal direction F2. In other words, the conveying-direction gap forming portion 18i protrudes from the plate body 18b between the pair of first engagement protrusions 18c and 18d and between the pair of second engagement protrusions 18e and 18f, so as to be sandwiched between the corners 14h of the pair of heat treatment vessels 14A and 14B with which the pair of first engagement protrusions 18c and 18d engage respectively and between the corners 14*h* of the pair of heat treatment vessels 14C and 14D with which the pair of second engagement protrusions 18*e* and 18*f* engage respectively. For this reason, when the coupler 18 is assembled to the corners 14*h* of the heat treatment vessels 14A to 14D as shown in FIG. 1, the conveying-direction gap forming portion 18*i* of the spacer protrusion 18*g* intervenes between the corners 14*h* of the heat treatment vessels 14A and 14B adjacent in the conveying direction F1 and between the corners 14*h* of the heat treatment vessels 14C and 14D adjacent in the conveying direction F1, to form a gap i.e. a conveying-direction gap S1 between the front wall 14*b* of the heat treatment vessel 14A and the rear wall 14*c* of the heat treatment vessel 14B and between the rear wall 14*c* of the heat treatment vessel 14C and the front wall 14*b* of the heat treatment vessel 14D.

As shown in FIGS. 1, 3, and 4, the orthogonal-direction gap forming portion 18*j* protrudes from the plate body 18*b* between the first engagement protrusion 18*c* and the second engagement protrusion 18*f* and between the first engagement protrusion 18*d* and the second engagement protrusion 18*e*, so as to be sandwiched between the corners 14*h* of the pair of heat treatment vessels 14A and 14D and between the corners 14*h* of the pair of heat treatment vessels 14B and 14C. In other words, the orthogonal-direction gap forming portion 18*j* protrudes from the plate body 18*b* between the first engagement protrusion 18*c* and the second engagement protrusion 18*f* and between the first engagement protrusion 18*d* and the second engagement protrusion 18*e*, so as to be sandwiched between the corners 14*h* of the pair of heat treatment vessels 14A and 14D with which the pair of first engagement protrusions 18*c* and 18*f* engage respectively and between the corners 14*h* of the pair of heat treatment vessels 14B and 14C with which the first engagement protrusion 18*d* and the second engagement protrusion 18*e* engage respectively. For this reason, when the coupler 18 is assembled to the corners 14*h* of the heat treatment vessels 14A to 14D as shown in FIG. 1, the orthogonal-direction gap forming portion 18*j* of the spacer protrusion 18*g* intervenes between the corners 14*h* of the heat treatment vessels 14A and 14D adjacent in the orthogonal direction F2 and between the corners 14*h* of the heat treatment vessels 14B and 14C adjacent in the orthogonal direction F2, to form a gap i.e. an orthogonal-direction (lateral) gap S2 between the left wall 14*e* of the heat treatment vessel 14A and the right wall 14*d* of the heat treatment vessel 14D and between the left wall 14*e* of the heat treatment vessel 14B and the right wall 14*d* of the heat treatment vessel 14C.

In the heat treatment furnace 12 configured as above, when any of the four heat treatment vessels 14A to 14D coupled together by the coupler 18 try to meander, the corners 14*h* of the heat treatment vessels 14A to 14D come into engagement with corresponding ones of the pair of first engagement protrusions 18*c* and 18*d* and the pair of second engagement protrusions 18*e* and 18*f*, so that the heat treatment vessels 14A to 14D are restrained from being displaced mutually. By sandwiching the spacer protrusion 18*g* between the four heat treatment vessels 14A to 14D, the four heat treatment vessels 14A to 14D are restrained from coming closer to one another, so that the four heat treatment vessels 14A to 14D coupled together by the coupler 18 are conveyed inside the heat treatment furnace 12 with the conveying-direction gap S1 and the orthogonal-direction gap S2 formed between the four heat treatment vessels 14A to 14D. By virtue of formation of the gaps i.e. the conveying-direction gap S1 and the orthogonal-direction gap S2 between the four heat treatment vessels 14A to 14D, it is possible to appropriately moderate thermal shock generated by temperature difference between the adjacent heat treatment vessels 14A to 14D and to appropriately suppress sticking to one another between the adjacent heat treatment vessels 14A to 14D, facilitating separation from one another.

As described above, the coupler 18 for the heat treatment vessels 14A to 14D of this embodiment includes: the plate body 18*b* smaller in size than the heat treatment vessels 14A to 14D; the pair of first engagement protrusions 18*c* and 18*d* protruding from the plate body 18*b* to engage with the inner side of the corners 14*h* of the heat treatment vessels 14A and 14B; the pair of second engagement protrusions 18*e* and 18*f* protruding from the plate body 18*b* to engage with the inner side of the corners 14*h* of the heat treatment vessels 14C and 14D; and the spacer protrusion 18*g* protruding from the plate body 18*b* between the pair of first engagement protrusions 18*c* and 18*d* and between the pair of second engagement protrusions 18*e* and 18*f* so as to be sandwiched between the heat treatment vessels 14A and 14B with which the pair of first engagement protrusions 18*c* and 18*d* engage respectively and between the heat treatment vessels 14C and 14D with which the pair of second engagement protrusions 18*e* and 18*f* engage respectively. Hence, when the heat treatment vessels 14A to 14D try to meander, the corners 14*h* of the heat treatment vessels 14A to 14D come into engagement with corresponding ones of the pair of first engagement protrusions 18*c* and 18*d* and the pair of second engagement protrusions 18*e* and 18*f*, so that the heat treatment vessels 14A to 14D are restrained from being displaced mutually, whereby meandering of the heat treatment vessels 14A to 14D can be suppressed. By sandwiching the spacer protrusion 18*g* between the heat treatment vessels 14A to 14D, the heat treatment vessels 14A to 14D are restrained from coming closer to one another, so that the heat treatment vessels 14A to 14D are conveyed inside the heat treatment furnace 12 with the conveying-direction gap S1 and the orthogonal-direction gap S2 formed between the heat treatment vessels 14A to 14D, thereby achieving easy separation of the heat treatment vessels 14A to 14D after heat treatment, as well as suppression of deterioration in circulation of atmosphere within the heat treatment furnace 12.

The coupler 18 for the heat treatment vessels 14A to 14D of this embodiment includes: a total of four engagement protrusions, i.e., the pair of first engagement protrusions 18*c* and 18*d* engaging with the corners 14*h* of the pair of heat treatment vessels 14A and 14B adjacent in the conveying direction F1 and the pair of second engagement protrusions 18*e* and 18*f* engaging with the corners 14*h* of the pair of heat treatment vessels 14C and 14D adjacent to the pair of heat treatment vessels 14B and 14A, respectively, in the orthogonal direction F2 perpendicular to the conveying direction F1; and the spacer protrusion 18*g* protruding from the plate body 18*b* between the four engagement protrusions so as to be sandwiched between the pair of heat treatment vessels 14A and 14B adjacent in the conveying direction F1 and between the pair of heat treatment vessels 14C and 14D adjacent in the orthogonal direction F2 perpendicular to the conveying direction F1. Thus, mutual displacement is restricted among the total of four heat treatment vessels 14A to 14D, i.e., the pair of heat treatment vessels 14A and 14B adjacent in the conveying direction F1 and the pair of heat treatment vessels 14C and 14D adjacent in the orthogonal direction F2 perpendicular to the conveying direction F1, thereby rendering it possible to properly suppress meandering of the heat treatment vessels 14A to 14D by the single coupler 18.

In the coupler 18 for the heat treatment vessels 14A to 14D of this embodiment, the spacer protrusion 18*g* includes: the conveying-direction gap forming portion 18*i* intervening between two ones adjacent in the conveying direction F1, of the heat treatment vessels 14A to 14D, to form the conveying-direction gap S1; and the orthogonal-direction gap forming portion 18j intervening between two ones adjacent in the orthogonal direction F2 perpendicular to the conveying direction F1, of the heat treatment vessels 14A to 14D, to form the orthogonal-direction gap S2. Mutual proximity is therefore restricted among the total of four heat treatment vessels 14A to 14D, i.e., the pair of heat treatment vessels 14A and 14B adjacent in the conveying direction F1 and the pair of heat treatment vessels 14C and 14D adjacent in the orthogonal direction F2 perpendicular to the conveying direction F1, whereupon the heat treatment vessels 14A to 14D can be conveyed with the conveying-direction gap S1 and the orthogonal-direction gap S2 formed, respectively, between two ones adjacent in the conveying direction F1 and between two ones adjacent in the orthogonal direction F2 perpendicular to the conveying direction F1, of the heat treatment vessels 14A to 14D.

In the coupler 18 for the heat treatment vessels 14A to 14D of this embodiment, the conveying-direction gap forming portion 18i has a shape elongated in the orthogonal direction F2 perpendicular to the conveying direction F1, while the orthogonal-direction gap forming portion 18j has a shape elongated in the conveying direction F1, with the spacer protrusion 18g being a raised portion composed of the conveying-direction gap forming portion 18i and the orthogonal-direction gap forming portion 18j that intersect at right angles. Mutual proximity is therefore restricted among the total of four heat treatment vessels 14A to 14D, i.e., the pair of heat treatment vessels 14A and 14B adjacent in the conveying direction F1 and the pair of heat treatment vessels 14C and 14D adjacent in the orthogonal direction F2 perpendicular to the conveying direction F1, whereupon the heat treatment vessels 14A to 14D can be conveyed with the conveying-direction gap S1 and the orthogonal-direction gap S2 formed, respectively, between two ones adjacent in the conveying direction F1 and between two ones adjacent in the orthogonal direction F2 perpendicular to the conveying direction F1, of the heat treatment vessels 14A to 14D.

Another embodiment of the present invention will then be described. In the following description, parts common to the embodiments are designated at the same reference numerals and will not again be described.

Second Embodiment

Figure 5:
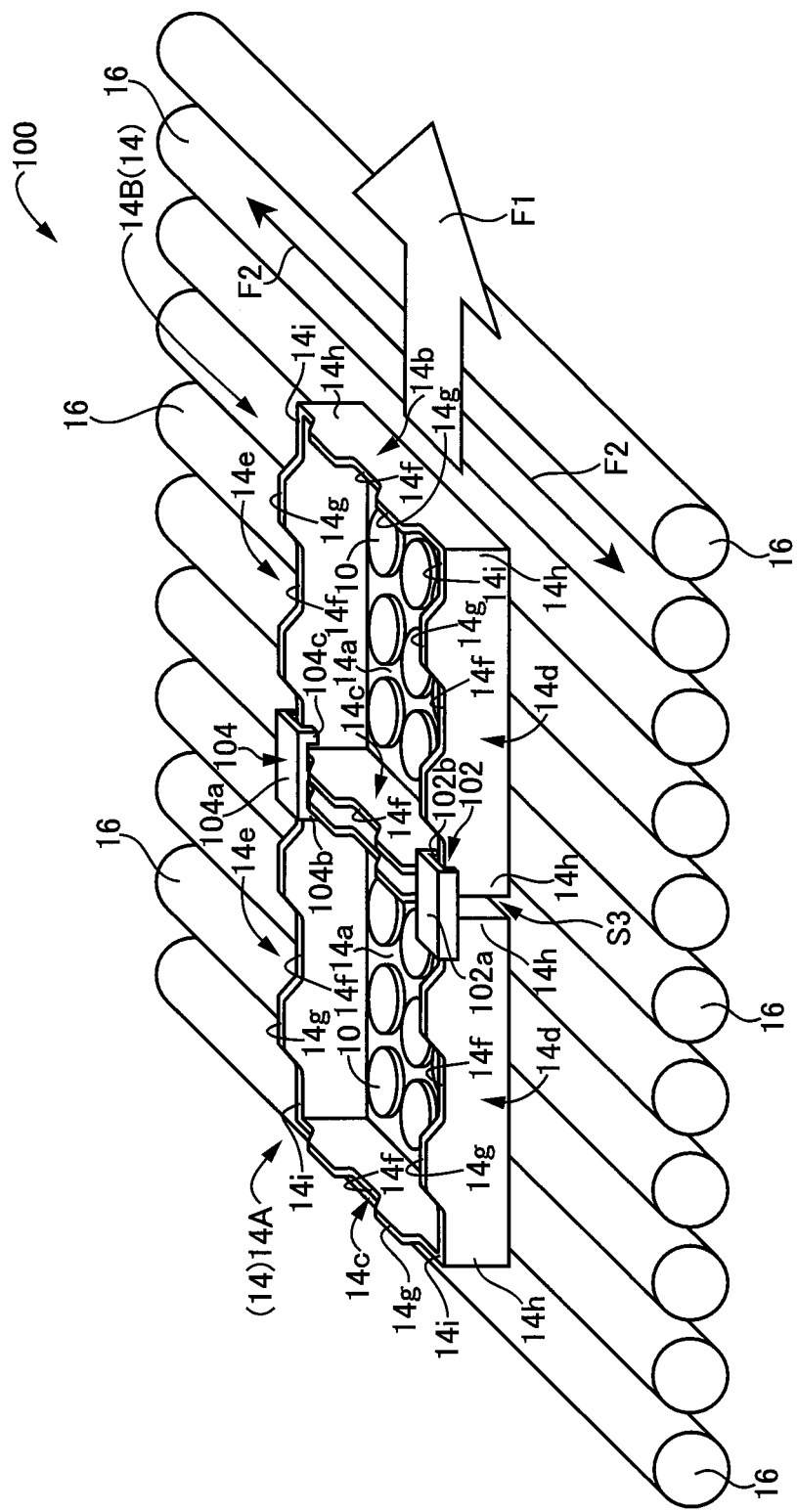
FIG. 5 is a perspective view explaining a schematic configuration of a heat treatment furnace of another embodiment of the present invention.

FIG. 5 is a perspective view explaining a schematic configuration of a heat treatment furnace 100 of another embodiment of the present invention. As shown in FIG. 5, the heat treatment furnace 100 of this embodiment is substantially the same as the heat treatment furnace 12 of the first embodiment except that a pair of heat treatment vessels 14A and 14B adjacent in the conveying direction F1 are conveyed in the conveying direction F1 and that the pair of heat treatment vessels 14A and 14B are coupled together by a first coupler (coupler) 102 and a second coupler (coupler) 104 in a pair. The pair of first coupler 102 and second coupler 104 are formed of a sintered body of a heat-resistant inorganic material similar to that of the coupler 18 of the first embodiment.

Figure 6:
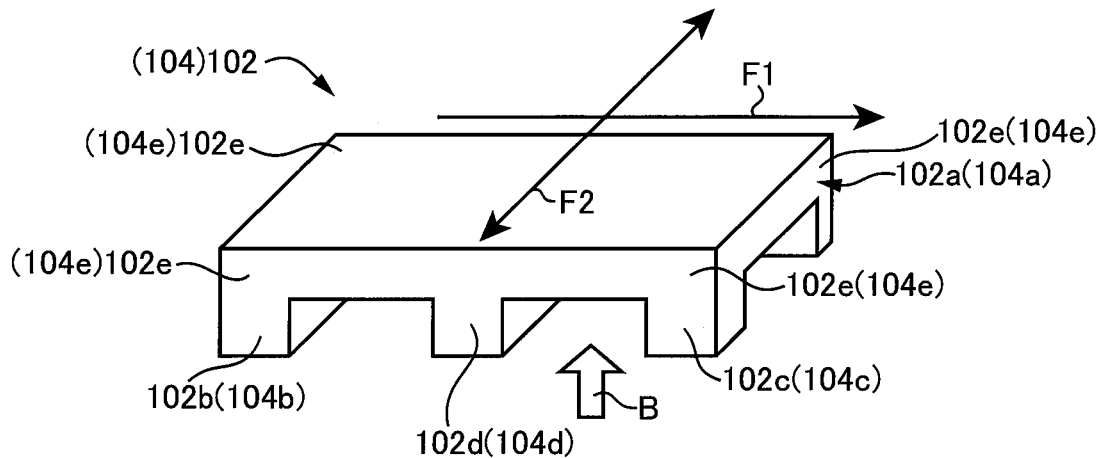
FIG. 6 is an enlarged view of one of the pair of first coupler and the second coupler shown in FIG. 5.
Figure 7:
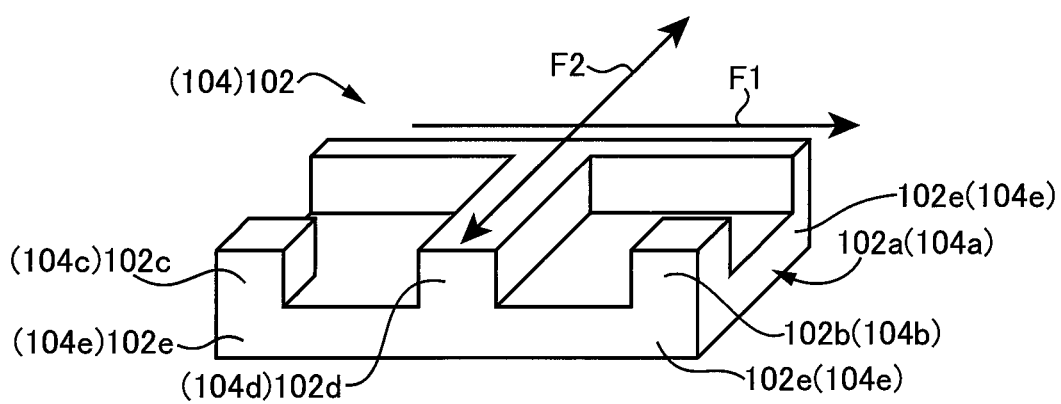
FIG. 7 is a view of the coupler of FIG. 6, seen from the direction of arrow B.

The first coupler 102 includes integrally, as shown in FIGS. 5 to 7, a plate body 102a, a pair of engagement protrusions 102b and 102c, and a spacer protrusion 102d. The second coupler 104 includes integrally a plate body 104a, a pair of engagement protrusions 104b and 104c, and a spacer protrusion 104d. The first coupler 102 and the second coupler 104 are formed in the same shape. FIG. 6 is an enlarged view of one of the pair of first coupler 102 and the second coupler 104 shown in FIG. 5. FIG. 7 is a view of the coupler of FIG. 6, seen from the direction of arrow B.

The plate body 102a and the plate body 104a are each a plate member of e.g. a rectangular shape, smaller in size than the bottom walls 14a of the heat treatment vessels 14A and 14B. The pair of first engagement protrusions 102b and 102c are two engagement protrusions, as shown in FIGS. 5 to 7, that protrude prismatically from the plate body 102a at its two corners 102e so as to engage, respectively, with a corner 14h of the heat treatment vessel 14B and with a corner 14h of the heat treatment vessel 14A. The engagement protrusion 102b engages with the corner 14h between the rear wall 14c and the right wall 14d of the heat treatment vessel 14B, while the engagement protrusion 102c engages with the corner 14h between the front wall 14b and the right wall 14d of the heat treatment vessel 14A. The pair of first engagement protrusions 104b and 104c are two engagement protrusions, as shown in FIGS. 5 to 7, that protrude prismatically from the plate body 104a at its two corners 104e so as to engage, respectively, with a corner 14h of the heat treatment vessel 14A and with a corner 14h of the heat treatment vessel 14B. The engagement protrusion 104b engages with the corner 14h between the front wall 14b and the left wall 14e of the heat treatment vessel 14A, while the engagement protrusion 104c engages with the corner 14h between the rear wall 14c and the left wall 14e of the heat treatment vessel 14B.

The spacer protrusion 102d is a longitudinal protrusion, as shown in FIGS. 5 to 7, that extends prismatically in the orthogonal direction F2 perpendicular to the conveying direction F1. The spacer protrusion 102d protrudes from the plate body 102a between the pair of (two) engagement protrusions 102b and 102c, so as to be sandwiched between the corners 14h of the pair of heat treatment vessels 14A and 14B adjacent in the conveying direction F1, i.e., so as to be sandwiched between the corner 14h between the front wall 14b and the right wall 14d of the heat treatment vessel 14A and the corner 14h between the rear wall 14c and the right wall 14d of the heat treatment vessel 14B.

The spacer protrusion 104d is a longitudinal protrusion, as shown in FIGS. 5 to 7, that extends prismatically in the orthogonal direction F2 perpendicular to the conveying direction F1. The spacer protrusion 104d protrudes from the plate body 104a between the pair of (two) engagement protrusions 104b and 104c, so as to be sandwiched between the corners 14h of the pair of heat treatment vessels 14A and 14B adjacent in the conveying direction F1, i.e., so as to be sandwiched between: the corner 14h between the front wall 14b and the left wall 14e of the heat treatment vessel 14A; and the corner 14h between the rear wall 14c and the left wall 14e of the heat treatment vessel 14B. For this reason, when the pair of first coupler 102 and second coupler 104 are assembled to the corners 14h of the heat treatment vessels 14A and 14B as shown in FIG. 5, the spacer protrusions 102d and 104d intervene between corresponding ones of the corners 14h of the heat treatment vessels 14A and 14B adjacent in the conveying direction F1, to form a conveying-direction gap S3 between the front wall 14b of the heat treatment vessel 14A and the rear wall 14c of the heat treatment vessel 14B.

In the heat treatment furnace 100 configured as above, when the pair of heat treatment vessels 14A and 14B coupled together by the pair of first coupler 102 and second coupler 104 try to meander, the corners 14h of the heat treatment vessels 14A and 14B come into engagement with corresponding ones of the pair of engagement protrusions 102b and 102c of the first coupler 102 and the pair of engagement protrusions 104b and 104c of the second coupler 104, so that the heat treatment vessels 14A and 14B are restrained from being displaced mutually. By sandwiching the spacer protrusions 102d and 104d between the pair of heat treatment vessels 14A and 14B, the pair of heat treatment vessels 14A and 14B are restrained from coming closer to each other, so that the pair of heat treatment vessels 14A and 14B coupled together by the pair of first coupler 102 and second coupler 104 are conveyed inside the heat treatment furnace 100 with the conveying-direction gap S3 formed between the pair of heat treatment vessels 14A and 14B.

As described above, in the first coupler 102 for the heat treatment vessels 14A and 14B of this embodiment, the pair of engagement protrusions 102b and 102c are two engagement protrusions that engage with corresponding ones of the corners 14h of the pair of heat treatment vessels 14A and 14B adjacent in the conveying direction F1, with the spacer protrusion 102d projecting from the plate body 102a between the two engagement protrusions so as to be sandwiched between the pair of heat treatment vessels 14A and 14B adjacent in the conveying direction F1. This restricts mutual displacement of the pair of heat treatment vessels 14A and 14B adjacent in the conveying direction F1, whereupon while suppressing meandering of those heat treatment vessels 14 in tandem, the pair of heat treatment vessels 14A and 14B adjacent in the conveying direction F1 can be conveyed with the conveying-direction gap S3 formed between the pair of heat treatment vessels 14A and 14B adjacent in the conveying direction F1.

Third Embodiment

Figure 8:
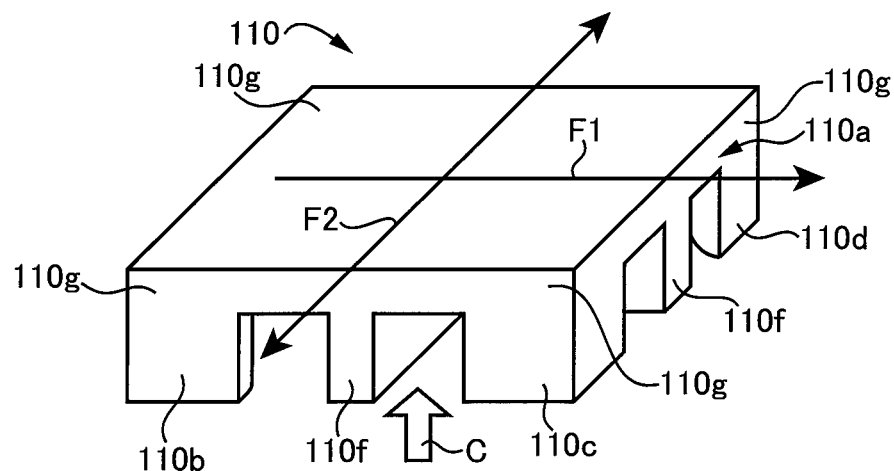
FIG. 8 is a perspective view explaining a configuration of a coupler disposed in a heat treatment furnace of another embodiment of the present invention.

FIG. 8 is a perspective view explaining a configuration of a coupler 110 disposed in a heat treatment furnace of another embodiment of the present invention. The heat treatment furnace of this embodiment is substantially the same as the heat treatment furnace 12 of the first embodiment except that the coupler 110 differs in shape from the coupler 18 of the first embodiment. The coupler 110 is formed of a sintered body of a heat-resistant inorganic material similar to that of the coupler 18 of the first embodiment.

Figure 9:
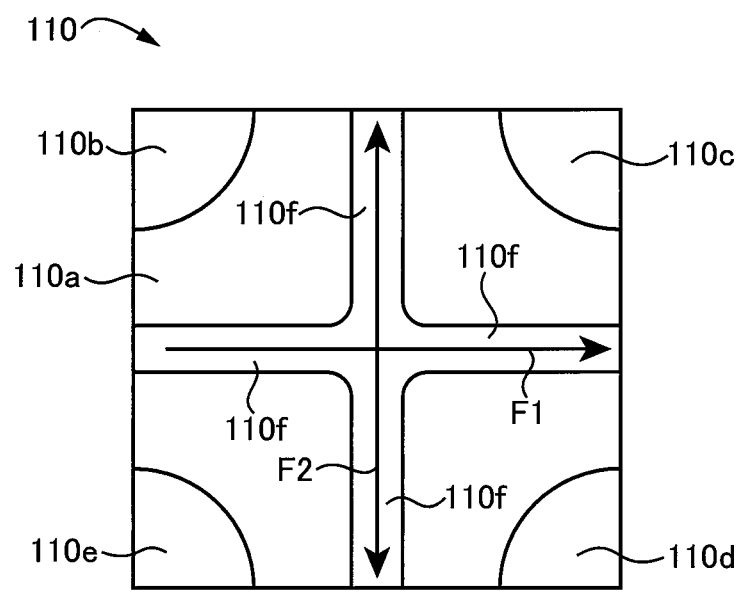
FIG. 9 is a view of the coupler of FIG. 8, seen from the direction of arrow C.

The coupler 110 includes integrally, as shown in FIGS. 8 and 9, a plate body 110a, a pair of first engagement protrusions (engagement protrusions) 110b and 110c, a pair of second engagement protrusions (engagement protrusions) 110d and 110e, and a spacer protrusion 110f. The plate body 110a is a plate member of e.g. a square shape, smaller in size than the bottom walls 14a of the heat treatment vessels 14A to 14D. The pair of first engagement protrusions 110b and 110c have the same function as that of the pair of first engagement protrusions 18c and 18d of the first embodiment and protrude arcuately in section from the plate body 110a at its two corners 110g, to engage respectively with a corresponding one of corners 14h of the heat treatment vessel 14A and with a corresponding one of corners 14h of the heat treatment vessel 14B. The pair of second engagement protrusions 110d and 110e have the same function as that of the pair of second engagement protrusions 18e and 18f of the first embodiment and protrude arcuately in section from the plate body 110a at its two corners 110g, to engage respectively with a corresponding one of corners 14h of the heat treatment vessel 14C and with a corresponding one of corners 14h of the heat treatment vessel 14D. The spacer protrusion 110f has the same function of that of the spacer protrusion 18g of the first embodiment and protrudes from the plate body 110a between the pair of first engagement protrusions 110b and 110c and between the pair of second engagement protrusions 110d and 110e so as to be sandwiched between corresponding ones of the corners 14h of the heat treatment vessels 14A and 14B with which the pair of first engagement protrusions 110b and 110c engage and between corresponding ones of the corners 14h of the heat treatment vessels 14C and 14D with which the pair of second engagement protrusions 110d and 110e engage. FIG. 9 is a view of the coupler 110 of FIG. 8, seen from the direction of arrow C.

Fourth Embodiment

Figure 10:
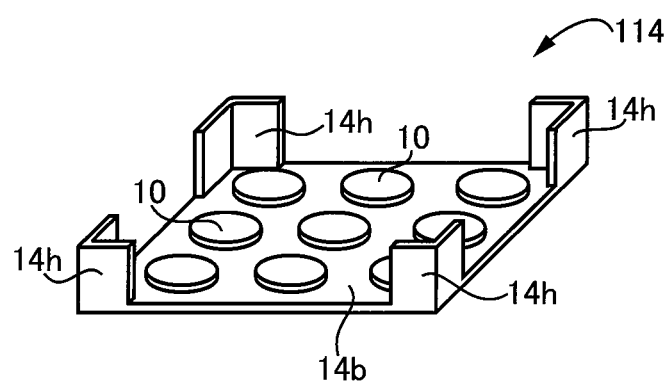
FIG. 10 is a perspective view explaining a configuration of a heat treatment vessel disposed in a heat treatment furnace of another embodiment of the present invention.

FIG. 10 is a perspective view explaining a configuration of a heat treatment vessel 114 disposed in a heat treatment furnace of another embodiment of the present invention. The heat treatment furnace of this embodiment is substantially the same as the heat treatment furnace 12 of the first embodiment except that the heat treatment vessel 114 differs in shape from the heat treatment vessel 14 of the first embodiment. The heat treatment vessel 114 is formed, as shown in FIGS. 1 and 10, by removing the front wall 14b, the rear wall 14c, the right wall 14d, and the left wall 14e, other than the four corners 14h, from the heat treatment vessel 14 of the first embodiment.

Fifth Embodiment

Figure 11:
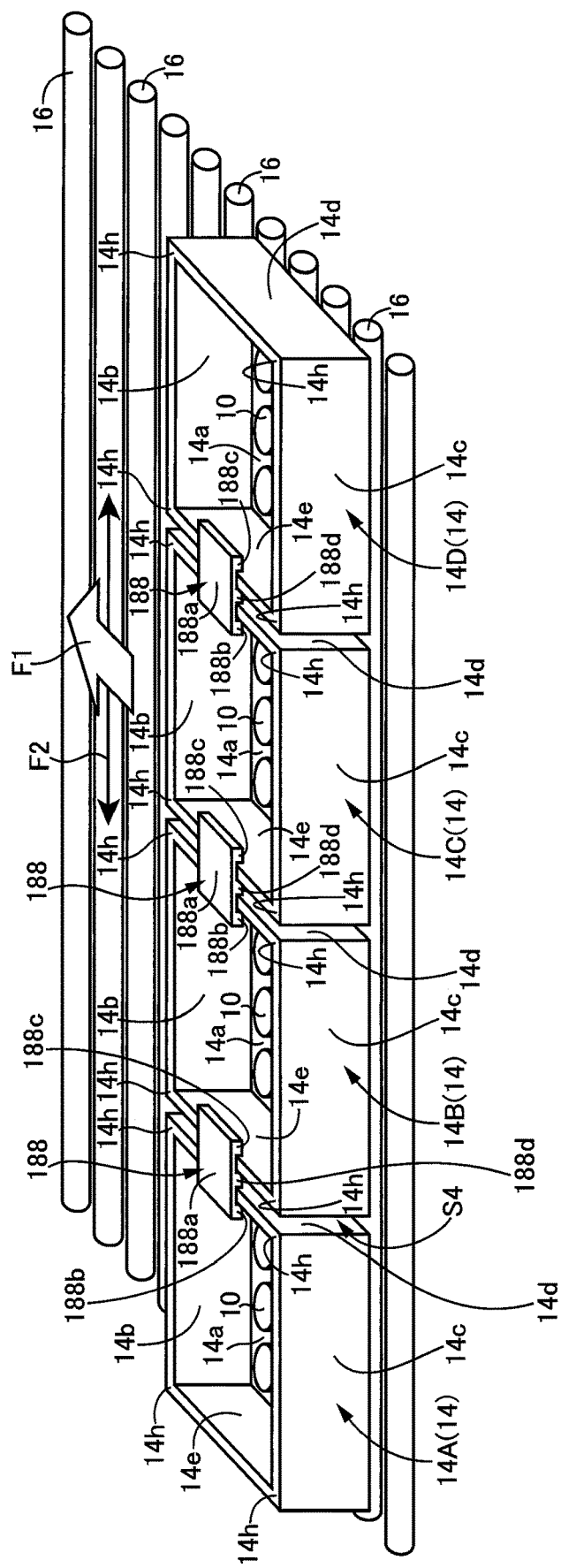
FIG. 11 is a perspective view explaining a schematic configuration of the continuous conveyor type heat treatment furnace to which a coupler of another example (Example 5) of the present invention is properly applied.

FIG. 11 is a perspective view explaining a schematic configuration of the continuous conveyor type heat treatment furnace 12 to which a coupler 188 of an example of the present invention is properly applied.

The configuration of the coupler 188 will be described with the four heat treatment vessels 14 of FIG. 11 identified as the heat treatment vessels 14A to 14D. The heat treatment vessel 14A is the heat treatment vessel 14 arranged on the leftmost side in the conveying direction F1, of the four heat treatment vessels 14. The heat treatment vessel 14B is the heat treatment vessel 14 adjacent to the heat treatment vessel 14A in the orthogonal direction F2, i.e., the heat treatment vessel 14 arranged on the right side of the heat treatment vessel 14A in the conveying direction F1. The heat treatment vessel 14C is the heat treatment vessel 14 arranged on the right side of the heat treatment vessel 14B in the conveying direction F1. The heat treatment vessel 14D is the heat treatment vessel 14 arranged on the right side of the heat treatment vessel 14C in the conveying direction F1, i.e., the heat treatment vessel 14 arranged on the rightmost side in the conveying direction F1, of the four heat treatment vessels 14. The four heat treatment vessels 14 are disposed, as shown in FIG. 11, with the coupler 188 coupling the heat treatment vessels 14A and 14B together, the coupler 188 coupling the heat treatment vessels 14B and 14C together, and the coupler 188 coupling the heat treatment vessels 14C and 14D together, the three couplers 188 each being of the same shape. The configuration of the coupler 188 will hereinafter be described using the coupler 188 that couples together the heat treatment vessel (heat treatment vessel on one hand) 14A and the heat treatment vessel (heat treatment vessel on the other) 14B adjacent in the orthogonal direction F2.

Figure 12:
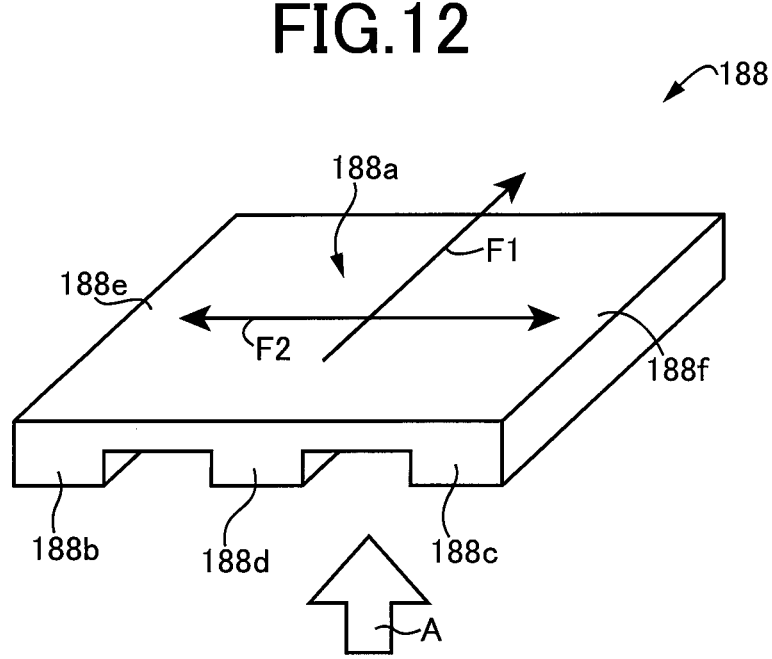
FIG. 12 is an enlarged view of the coupler coupling together the heat treatment vessels adjacent in the orthogonal direction in FIG. 11.
Figure 13:
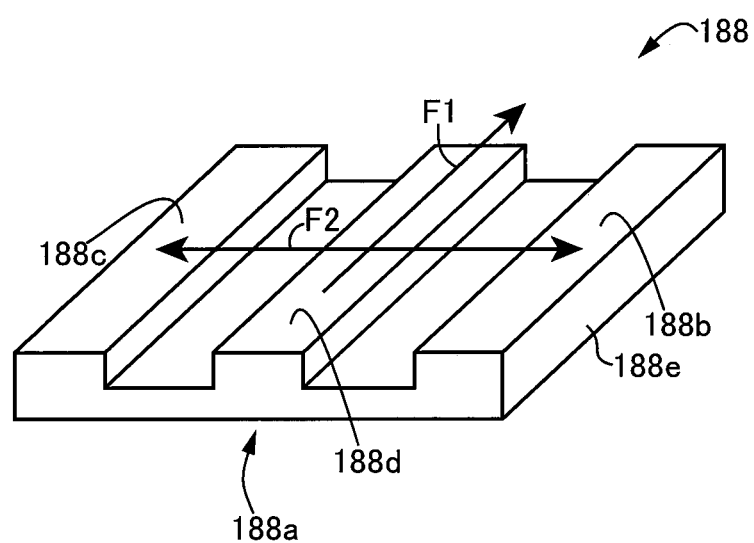
FIG. 13 is a view of the coupler of FIG. 12, seen from the direction of arrow A.

The coupler 188 includes integrally, as shown in FIGS. 11 to 13, a plate body 188a, a pair of engagement protrusions 188b and 188c, and a spacer protrusion 188d. FIG. 12 is an enlarged view of the coupler 188 coupling together the heat treatment vessels 14A and 14B adjacent in the orthogonal direction F2 in FIG. 11, while FIG. 13 is a view of the coupler 188 of FIG. 12, seen from the direction of arrow A. As shown in FIG. 11, the plate body 188a is, for example, a square plate member sufficiently smaller in size than the bottom walls 14a of the heat treatment vessels 14A and 14B, the plate body 188a having sides less than or equal to one-third the length of one side of the heat treatment vessels 14A and 14B. As shown in FIGS. 11 to 13, the engagement protrusion 188b on one hand of the pair of engagement protrusions 188b and 188c protrudes integrally from the plate body 188a and engages with the right wall 14d that is one side wall lying toward the heat treatment vessel 14B, of the front wall 14b, rear wall 14c, right wall 14d, and left wall 14e of the heat treatment vessel 14A. As shown in FIGS. 11 to 13, the engagement protrusion 188c on the other of the pair of engagement protrusions 188b and 188c protrudes integrally from the plate body 188a and engages with the left wall 14e that is the other side wall confronting the right wall 14d of the heat treatment vessel 14A, of the front wall 14b, rear wall 14c, right wall 14d, and left wall 14e of the heat treatment vessel 14B. As shown in FIGS. 11 to 13, the spacer protrusion 188d protrudes from the plate body 188a between the pair of engagement protrusions 188b and 188c so as to be sandwiched between the right wall 14d of the heat treatment vessel 14A and the left wall 14e of the heat treatment vessel 14B.

The engagement protrusion 188b on one hand of the pair of engagement protrusions 188b and 188c is a protrusion, as shown in FIGS. 11 to 13, that is elongated in the conveying direction F1 and that protrudes on the plate body 188a from a side edge 188e lying toward the heat treatment vessel 14A so as to face the right wall 14d of the heat treatment vessel 14A. The engagement protrusion 188c on the other of the pair of engagement protrusions 188b and 188c is a protrusion, as shown in FIGS. 11 to 13, that is elongated in the conveying direction F1 and that protrudes on the plate body 188a from a side edge 188f lying toward the heat treatment vessel 14B so as to face the right wall 14d of the heat treatment vessel 14B. The spacer protrusion 188d is a protrusion, as shown in FIGS. 11 to 13, that is elongated in the conveying direction F1 and that protrudes on the plate body 188a between the pair of engagement protrusions 188b and 188c and between the right wall 14d of the heat treatment vessel 14A and the left wall 14e of the heat treatment vessel 14B.

According to the thus configured heat treatment furnace 12, if the heat treatment vessels 14A and 14B adjacent in the orthogonal direction F2 are each about to progress differently, the right wall 14d of the heat treatment vessel 14A or the left wall 14e of the heat treatment vessel 14B comes into engagement with a corresponding one of the pair of engagement protrusions 188b and 188c so that mutual displacement is restricted between the heat treatment vessels 14A and 14B adjacent in the orthogonal direction F2. For example, if the progress of the heat treatment vessel 14A is going to be delayed with respect to the heat treatment vessel 14B, the right wall 14d of the heat treatment vessel 14A comes into engagement with the engagement protrusion 188b of the coupler 188 to generate a frictional force between the right wall 14d of the heat treatment vessel 14A and the engagement protrusion 188b, which frictional force restricts the relative displacement of the heat treatment vessel 14A in the conveying direction F1 with respect to the heat treatment vessel 14B. Since the heat treatment vessel 14 and the coupler 188 for use in this embodiment are made of a porous inorganic material and have rough surfaces, a relatively large frictional force occurs between the heat treatment vessel 14 and the coupler 188. Since the spacer protrusion 188d is sandwiched between the right wall 14d of the heat treatment vessel 14A and the left wall 14e of the heat treatment vessel 14B, the close proximity is restricted between the heat treatment vessels 14A and 14B, whereupon the heat treatment vessels 14A and 14B are conveyed inside the heat treatment furnace 12 with an orthogonal-direction gap S4 formed between the heat treatment vessels 14A and 14B adjacent in the orthogonal direction F2. The orthogonal-direction gap S4 allows circulation of atmosphere between above and below the heat treatment vessels 14A and 14B.

As described above, the coupler 188 for the heat treatment vessels 14A to 14D of this embodiment includes: the plate body 188a smaller than the heat treatment vessels 14A and 14B; the pair of engagement protrusions 188b and 188c protruding integrally from the plate body 188a and engaging respectively with the right wall 14d, lying toward the heat treatment vessel 14B on the other, of the side walls 14b to 14e of the heat treatment vessel 14A on one hand, of the heat treatment vessels 14A and 14B adjacent in the orthogonal direction F2 and with the left wall 14e, facing the right wall 14d of the heat treatment vessel 14A, of the side walls 14b to 14e of the heat treatment vessel 14B on the other; and the spacer protrusion 188d protruding from the plate body 188a between the pair of engagement protrusions 188b and 188c so as to be sandwiched between the right wall 14d of the heat treatment vessel 14A on one hand and the left wall 14e of the heat treatment vessel 14B on the other. In consequence, when the heat treatment vessels 14A and 14B are each about to progress differently, the right wall 14d of the heat treatment vessel 14A or the left wall 14e of the heat treatment vessel 14B comes into engagement with a corresponding one of the pair of engagement protrusions 188b and 188c so that mutual displacement is restricted between the heat treatment vessels 14A and 14B adjacent in the orthogonal direction F2, thus enabling progression variability to be reduced between the heat treatment vessels 14A and 14B. Since the spacer protrusion 188d is sandwiched between the right wall 14d of the heat treatment vessel 14A and the left wall 14e of the heat treatment vessel 14B, the intimate proximity is restricted between the heat treatment vessels 14A and 14B, whereupon the heat treatment vessels 14A and 14B are conveyed inside the heat treatment furnace 12 with the orthogonal-direction gap S4 formed between the heat treatment vessels 14A and 14B adjacent in the orthogonal direction F2, thus achieving suppression of deterioration in circulation of atmosphere within the heat treatment furnace 12.

In the coupler 188 for the heat treatment vessels 14A to 14D of this embodiment, the pair of engagement protrusions 188b and 188c and the spacer protrusion 188d are each of a shape elongated in the conveying direction F1 and are parallel to one another. Consequently, the elongated spacer protrusion 188d can properly restrict the close proximity between the heat treatment vessels 14A and 14B.

The coupler 188 for the heat treatment vessels 14A to 14D of this embodiment serves to couple together at least three heat treatment vessels 14 adjacent in the orthogonal direction F2, i.e., the four heat treatment vessels 14A to 14D. This can properly reduce progression variability of the three or more heat treatment vessels 14, i.e., the four heat treatment vessels 14A to 14D, which tend to progress differently from one another.

Sixth Embodiment

Figure 14:
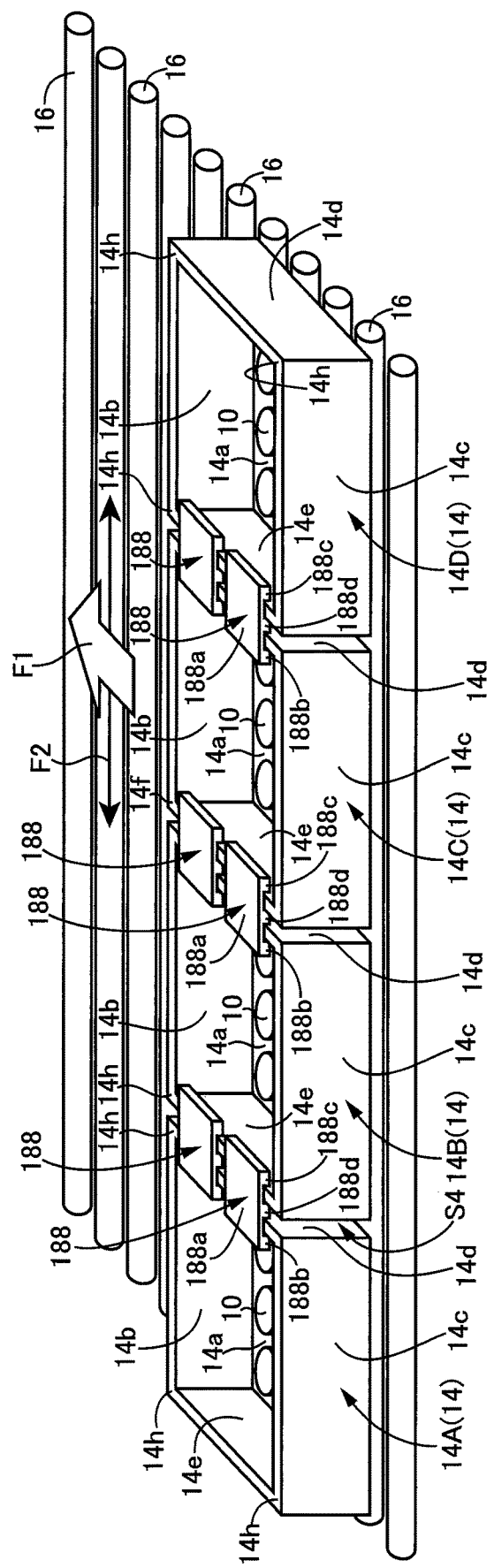
FIG. 14 is a perspective view explaining another example (Example 6) of application of the coupler of the present invention.

FIG. 14 is a perspective view explaining another example of application of the coupler 188 of the present invention. In the heat treatment furnace 12, as shown in FIG. 14, a pair of couplers 188 couple together the heat treatment vessels 14A and 14B adjacent in the orthogonal direction F2; another pair of couplers 188 couple together the heat treatment vessels 14B and 14C adjacent in the orthogonal direction F2; and a further pair of couplers 188 couple together the heat treatment vessels 14C and 14D adjacent in the orthogonal direction F2.

Seventh Embodiment

Figure 15:
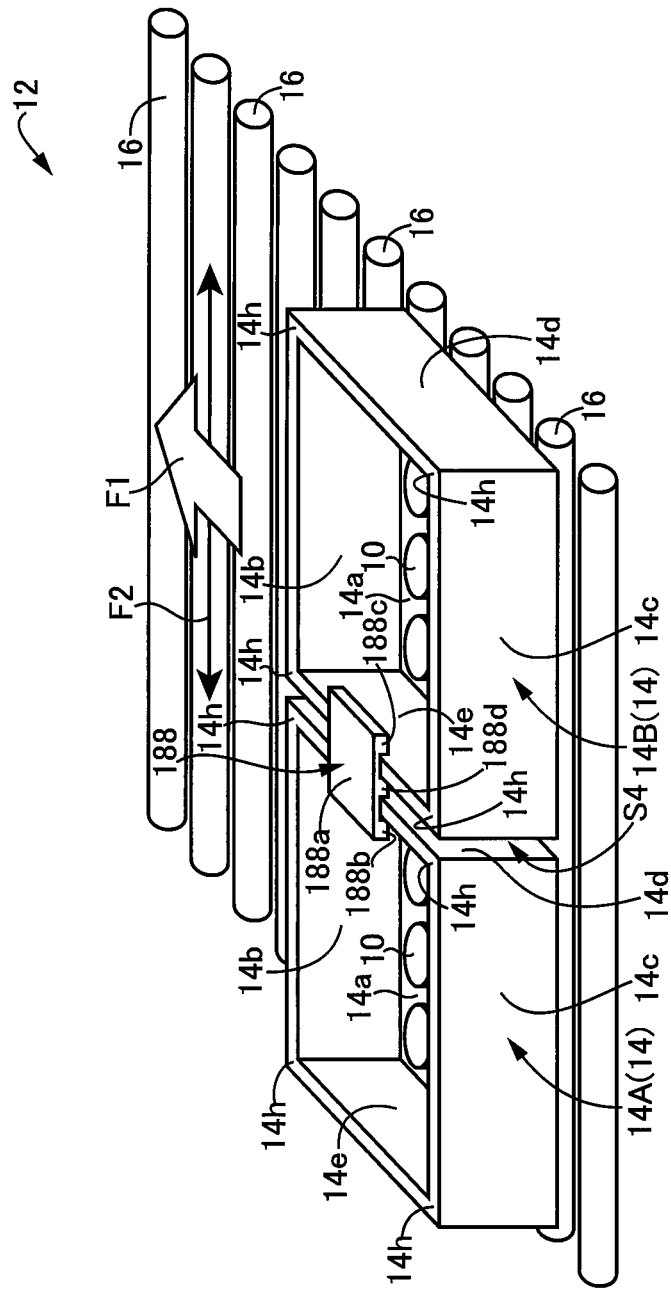
FIG. 15 is a perspective view explaining another example (Example 7) of application of the coupler of the present invention.

FIG. 15 is a perspective view explaining a further example of application of the coupler 188 of the present invention. In the heat treatment furnace 12, as shown in FIG. 15, the heat treatment vessels 14A and 14B adjacent in the orthogonal direction F2 are conveyed in the conveying direction F1, coupled together by use of a single coupler 188.

Eighth Embodiment

Figure 16:
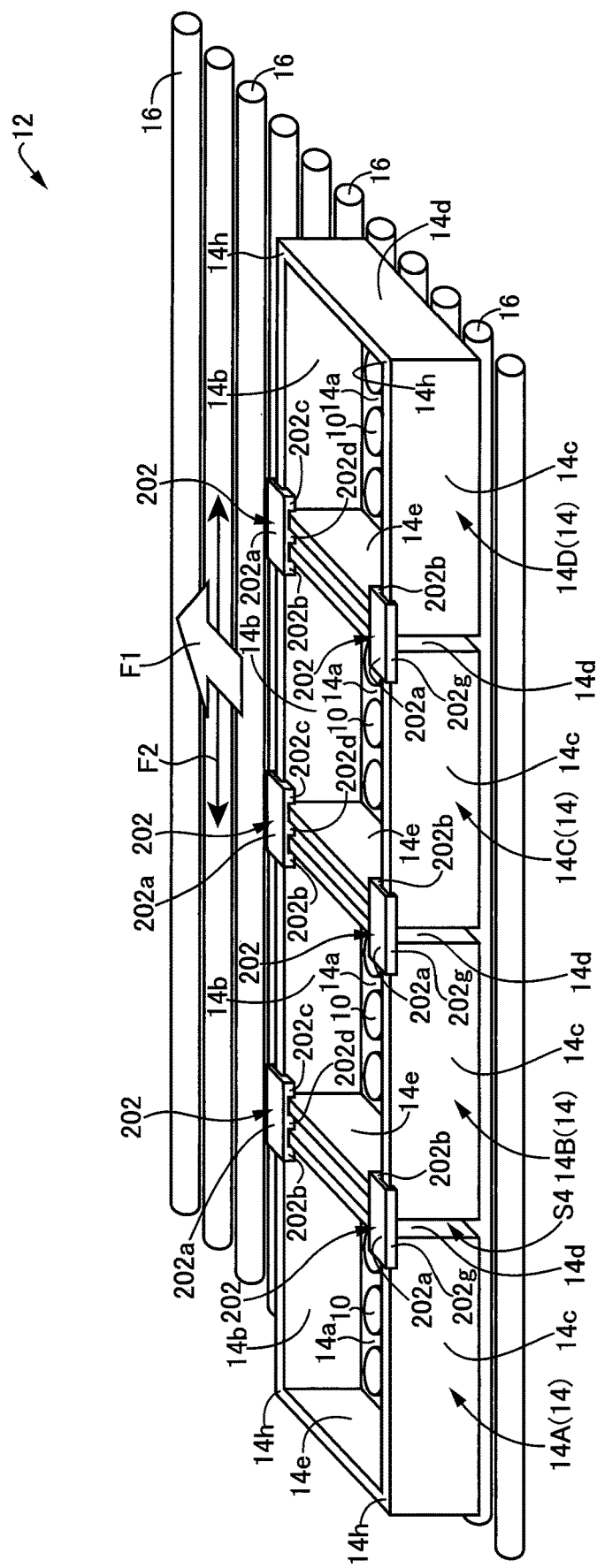
FIG. 16 is a perspective view explaining another example (Example 8) of application of the coupler of the present invention.

FIG. 16 is a perspective view explaining an example of application of a coupler 202 of another embodiment of the present invention. As shown in FIG. 16, the heat treatment furnace 12 is substantially the same as that of the first embodiment except that the coupler 202 has a different shape. The four heat treatment vessels 14 are disposed, as shown in FIG. 16, with a pair of couplers 202 coupling the heat treatment vessels 14A and 14B together, a pair of couplers 202 coupling the heat treatment vessels 14B and 14C together, and a pair of couplers 202 coupling the heat treatment vessels 14C and 14D together, the respective pairs of couplers 202 having the same shape. The configuration of the pair of couplers 202 will hereinafter be described using the pair of couplers 202 that couples together the heat treatment vessel (heat treatment vessel on one hand) 14A and the heat treatment vessel (heat treatment vessel on the other) 14B adjacent in the orthogonal direction F2. The pair of couplers 202 are formed of a sintered body of a heat-resistant inorganic material similar to that of the coupler 18 of the first embodiment.

Figure 17:
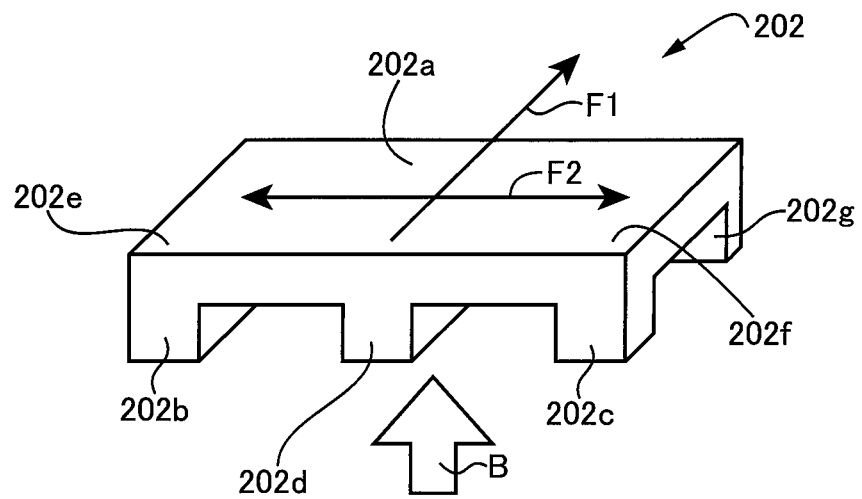
FIG. 17 is an enlarged view of one of the pair of couplers coupling together the heat treatment vessel and the heat treatment vessel adjacent in the orthogonal direction.
Figure 18:
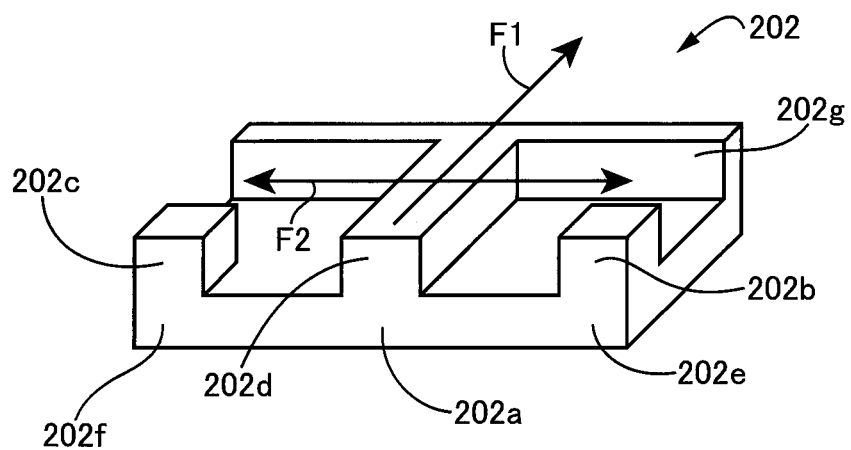
FIG. 18 is a view of the coupler of FIG. 17, seen from the direction of arrow B.

The coupler 202 includes integrally, as shown in FIGS. 16 to 18, a plate body 202a, a pair of engagement protrusions 202b and 202c, a spacer protrusion 202d, and a misalignment prevention protrusion 202g. FIG. 17 is an enlarged view of one of the pair of couplers 202 coupling together the heat treatment vessel 14A and the heat treatment vessel 14B adjacent in the orthogonal direction F2 in FIG. 16, while FIG. 18 is a view of the coupler 202 of FIG. 17, seen from the direction of arrow B. As shown in FIG. 16, the plate body 202a is, for example, a rectangular plate member extending in the orthogonal direction F2, sufficiently smaller in size than the bottom walls 14a of the heat treatment vessels 14A and 14B. As shown in FIGS. 17 and 18, the engagement protrusion 202b on one hand of the pair of engagement protrusions 202b and 202c protrudes integrally prismatically from the plate body 202a at its corner 202f. As shown in FIG. 16, the engagement protrusion 202b engages with an end, toward the front wall 14b, of the right wall 14d that is one side wall, lying toward the heat treatment vessel 14B, of the front wall 14b, rear wall 14c, right wall 14d, and left wall 14e of the heat treatment vessel 14A, i.e., with a corner 14f formed between the right wall 14d and the front wall 14b of the heat treatment vessel 14A. As shown in FIGS. 17 and 18, the engagement protrusion 202c on the other of the pair of engagement protrusions 202b and 202c protrudes integrally prismatically from the plate body 202a at its corner 202f. As shown in FIG. 16, the engagement protrusion 202c engages with an end, toward the front wall 14b, of the left wall 14e that is the other side wall, facing the right wall 14d of the heat treatment vessel 14A, of the front wall 14b, rear wall 14c, right wall 14d, and left wall 14e of the heat treatment vessel 14B, i.e., with a corner 14f formed between the left wall 14e and the front wall 14b of the heat treatment vessel 14B. The spacer protrusion 202d protrudes from the plate body 202a between the pair of engagement protrusions 202b and 202c so as to be sandwiched between the right wall 14d of the heat treatment vessel 14A and the left wall 14e of the heat treatment vessel 14B. The spacer protrusion 202d is elongated in the conveying direction F1. The misalignment prevention protrusion 202g protrudes from the plate body 202a at its side edge not having the pair of engagement protrusions 202b and 202c, of both side edges of the plate body 202a, in the same direction as the direction where the pair of engagement protrusions 202b and 202c protrude. The misalignment prevention protrusion 202g is joined at its central portion in the longitudinal direction to the spacer protrusion 202d. Between the misalignment prevention protrusion 202g and the pair of engagement protrusions 202b and 202c there is an interval greater than the thickness of the front wall 14b and the rear wall 14c.

According to the thus configured coupler 202, if the heat treatment vessels 14A and 14B adjacent in the orthogonal direction F2 are each about to progress differently, the corner 14f of the heat treatment vessel 14A or the corner 14f of the heat treatment vessel 14B abuts against a corresponding one of the pair of engagement protrusions 202b and 202c of the coupler 202, so that mutual displacement is restricted between the heat treatment vessels 14A and 14B adjacent in the orthogonal direction F2. For example, if the progress of the heat treatment vessel 14A is going to be delayed with respect to the heat treatment vessel 14B, the corner 14f formed between the right wall 14d and the front wall 14b of the heat treatment vessel 14A abuts against the engagement protrusion 202b of the coupler 202, thereby restricting the displacement of the heat treatment vessel 14A relative to the heat treatment vessel 14B. Since the spacer protrusion 202d is sandwiched between the right wall 14d of the heat treatment vessel 14A and the left wall 14e of the heat treatment vessel 14B, the close proximity is restricted between the heat treatment vessels 14A and 14B so that the heat treatment vessels 14A and 14B are conveyed inside the heat treatment furnace 12 with the orthogonal-direction gap S4 formed between the heat treatment vessels 14A and 14B adjacent in the orthogonal direction F2. The misalignment prevention protrusion 202g prevents misalignment of the couplers 202 by sandwiching the front wall 14b and the rear wall 14c between the misalignment prevention protrusion 202g and a corresponding one of the pair of engagement protrusions 202b and 202c. Since the misalignment prevention protrusion 202g lies outside of the front wall 14b and the rear wall 14c, a gap is formed between one pair of heat treatment vessels 14A and 14B and the other pair of heat treatment vessels 14A and 14B, adjacent in the conveying direction F1, to thereby secure vertical circulation of in-furnace atmosphere.

As described above, according to the coupler 202 for the heat treatment vessels 14A to 14D of this embodiment, the pair of engagement protrusions 202b and 202c engage respectively with an end of the right wall 14d of the heat treatment vessel 14A and with an end of the left wall 14e of the heat treatment vessel 14B. For this reason, if the heat treatment vessels 14A and 14B are each about to progress differently, the corner 14f of the heat treatment vessel 14A or 14B comes into abutment against a corresponding one of the pair of engagement protrusions 202b and 202c, so that mutual displacement can properly be restricted between the heat treatment vessels 14A and 14B adjacent in the orthogonal direction F2.

The coupler 202 for the heat treatment vessels 14A to 14D of this embodiment includes the misalignment prevention protrusion 202g that protrudes from the plate body 202a at its side edge not having the pair of engagement protrusions 202b and 202c, of both side edges of the plate body 202a, in the same direction as the direction where the pair of engagement protrusions 202b and 202c protrude, the misalignment prevention protrusion 202g lying with an interval greater than the thickness of the front wall 14b and the rear wall 14c of the heat treatment vessels 14A and 14B between the misalignment prevention protrusion 202g and the pair of engagement protrusions 202b and 202c. Hence, the misalignment prevention protrusion 202g can prevent misalignment of the couplers 202 by sandwiching the front wall 14b and the rear wall 14c of each of the heat treatment vessels 14A and 14B between the misalignment prevention protrusion 202g and the pair of engagement protrusions 202b and 202c.

Ninth Embodiment

Figure 19:
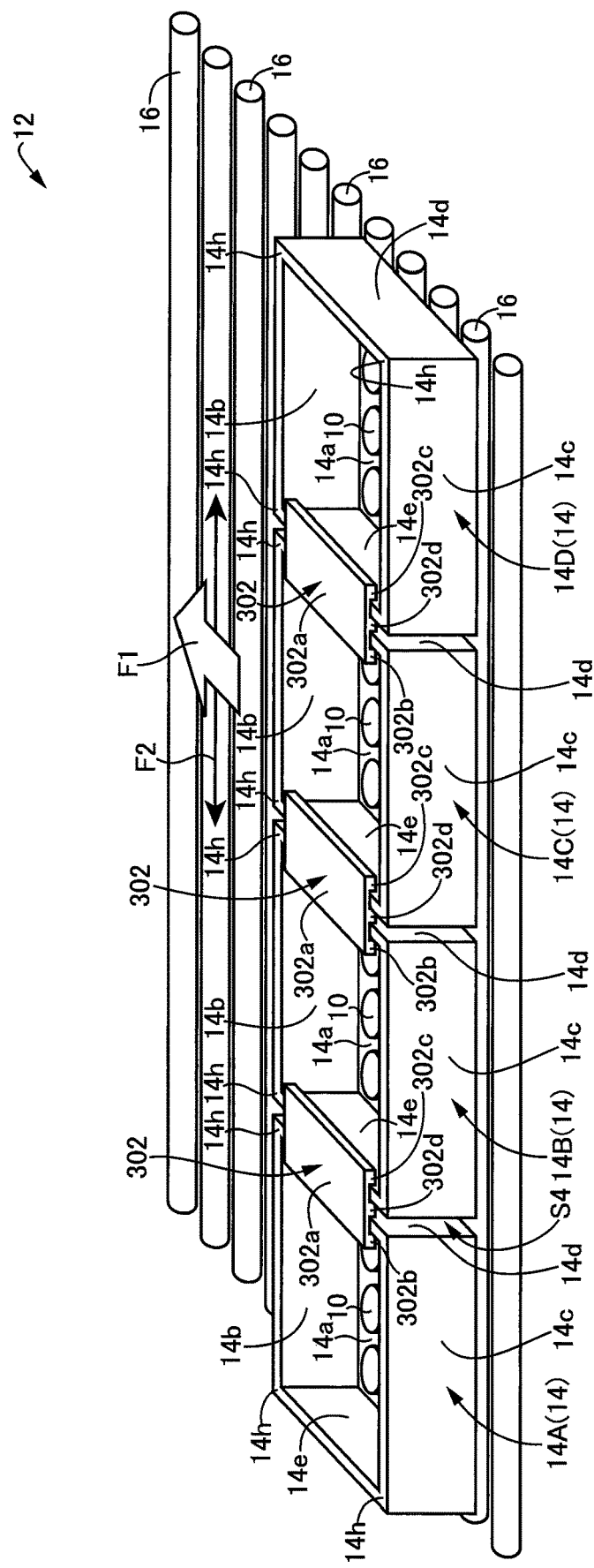
FIG. 19 is a perspective view explaining an example of application of a coupler of another embodiment (Example 9) of the present invention.

FIG. 19 is a perspective view explaining an example of application of a coupler 302 of another embodiment of the present invention. The four heat treatment vessels 14 are disposed, as shown in FIG. 19, with a coupler 302 coupling the heat treatment vessels 14A and 14B together, a coupler 302 coupling the heat treatment vessels 14B and 14C together, and a coupler 302 coupling the heat treatment vessels 14C and 14D together, those three couplers 302 having the same shape. The configuration of the coupler 302 will hereinafter be described using the coupler 302 that couples together the heat treatment vessel (heat treatment vessel on one hand) 14A and the heat treatment vessel (heat treatment vessel on the other) 14B adjacent in the orthogonal direction F2. The coupler 302 is formed of a sintered body of a heat-resistant inorganic material similar to that of the coupler 18 of the first embodiment.

Figure 20:
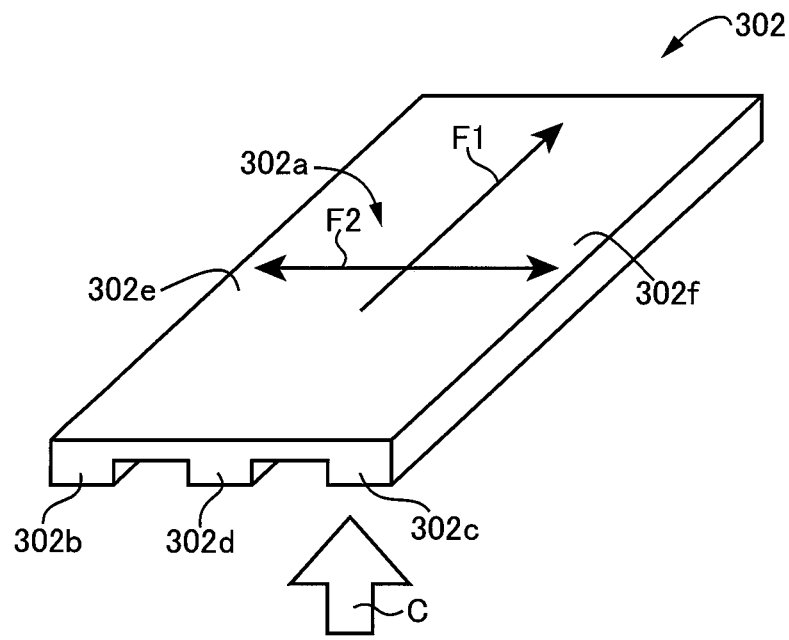
FIG. 20 is an enlarged view of the coupler coupling together the heat treatment vessel and the heat treatment vessel adjacent in the orthogonal direction in FIG. 19.
Figure 21:
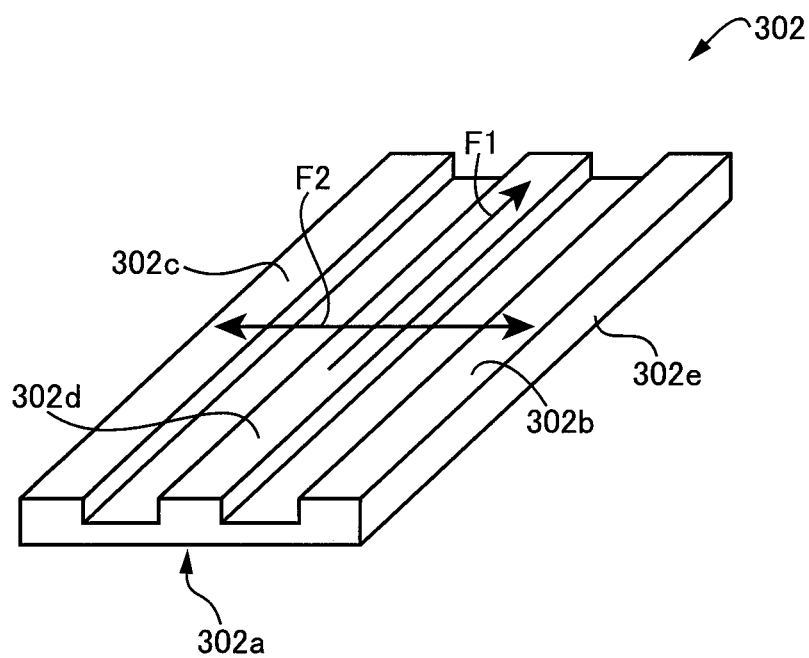
FIG. 21 is a view of the coupler of FIG. 20, seen from the direction of arrow C.

The coupler 302 includes integrally, as shown in FIGS. 19 to 21, a plate body 302a, a pair of engagement protrusions 302b and 302c, and a spacer protrusion 302d. FIG. 20 is an enlarged view of the coupler 302 coupling together the heat treatment vessel 14A and the heat treatment vessel 14B adjacent in the orthogonal direction F2 in FIG. 19, while FIG. 21 is a view of the coupler 302 of FIG. 19, seen from the direction of arrow C. As shown in FIG. 19, the plate body 302a is, for example, a rectangular plate member extending in the conveying direction F1, slightly smaller in size than the bottom walls 14a of the heat treatment vessels 14A and 14B, i.e., a long plate having a length along the right wall 14d of the heat treatment vessel 14A and the left wall 14e of the heat treatment vessel 14B between both ends of each of the right wall 14d and the left wall 14e. The engagement protrusion 302b on one hand of the pair of engagement protrusions 302b and 302c protrudes integrally from the plate body 302a as shown in FIGS. 20 and 21 and engages with the right wall 14d that is one side wall, lying toward the heat treatment vessel 14B, of the front wall 14b, rear wall 14c, right wall 14d, and left wall 14e of the heat treatment vessel 14A as shown in FIG. 19. The engagement protrusion 302c on the other of the pair of engagement protrusions 302b and 302c protrudes integrally from the plate body 302a as shown in FIGS. 20 and 21 and engages with the left wall 14e that is the other side wall, facing the right wall 14d of the heat treatment vessel 14A, of the front wall 14b, rear wall 14c, right wall 14d, and left wall 14e of the heat treatment vessel 14B as shown in FIG. 19. The spacer protrusion 302d protrudes from the plate body 302a between the pair of engagement protrusions 302b and 302c so as to be sandwiched between the right wall 14d of the heat treatment vessel 14A and the left wall 14e of the heat treatment vessel 14B as shown in FIGS. 19 to 21.

The engagement protrusion 302b on one hand of the pair of engagement protrusions 302b and 302c is a protrusion elongated in the conveying direction F1, that projects on the plate body 302a from the side edge 302e, lying toward the heat treatment vessel 14A, of the plate body 302a so as to face the right wall 14d of the heat treatment vessel 14A as shown in FIGS. 19 to 21. The engagement protrusion 302c on the other of the pair of engagement protrusions 302b and 302c is a protrusion elongated in the conveying direction F1, that projects on the plate body 302a from the side edge 302f, lying toward the heat treatment vessel 14B, of the plate body 302a so as to face the left wall 14e of the heat treatment vessel 14B as shown in FIGS. 19 to 21. The spacer protrusion 302d is a protrusion elongated in the conveying direction F1, that projects from the plate body 302a between the pair of engagement protrusions 302b and 302c and between the right wall 14d of the heat treatment vessel 14A and the left wall 14e of the heat treatment vessel 14B as shown in FIGS. 19 to 21.

For example, if the heat treatment vessels 14A and 14B adjacent in the orthogonal direction F2 are each about to progress differently, the right wall 14d of the heat treatment vessel 14A or the left wall 14e of the heat treatment vessel 14B comes into engagement with a corresponding one of the pair of engagement protrusions 302b and 302c, so that mutual displacement is restricted between the heat treatment vessels 14A and 14B adjacent in the orthogonal direction F2. For example, if the progress of the heat treatment vessel 14A is going to be delayed with respect to the heat treatment vessel 14B, the right wall 14d of the heat treatment vessel 14A comes into engagement with the engagement protrusion 302b of the coupler 302 to generate a frictional force between the right wall 14d of the heat treatment vessel 14A and the engagement protrusion 302b, which frictional force restricts the displacement of the heat treatment vessel 14A relative to the heat treatment vessel 14B. If the heat treatment vessels 14A and 14B adjacent in the orthogonal direction F2 are displaced mutually, the corner 14f of the heat treatment vessel 14A or 14B comes into abutment against a corresponding one of the pair of engagement protrusions 302b and 302c. Since the spacer protrusion 302d is sandwiched between the right wall 14d of the heat treatment vessel 14A and the left wall 14e of the heat treatment vessel 14B, the close proximity is restricted between the heat treatment vessels 14A and 14B, whereupon the heat treatment vessels 14A and 14B are conveyed inside the heat treatment furnace 12 with the orthogonal-direction gap S4 formed between the heat treatment vessels 14A and 14B adjacent in the orthogonal direction F2.

As described above, according to the coupler 302 for the heat treatment vessels 14A to 14D of this embodiment, in the state where the coupler 302 couples the adjacent vessels together, the plate body 302a is a long plate extending along the right wall 14d of the heat treatment vessel 14A and the left wall 14e of the heat treatment vessel 14B, with the engagement protrusion 302b on one hand of the pair of engagement protrusions 302b and 302c being an elongated protrusion that projects, on the plate body 302a that is the long plate, from the side edge 302e, lying toward the heat treatment vessel 14A, of the plate body 302 so as to face the right wall 14d of the heat treatment vessel 14A, and with the engagement protrusion 302c on the other of the pair of engagement protrusions 302b and 302c being an elongated protrusion that projects, on the plate body 302a that is the long plate, from the side edge 302f, lying toward the heat treatment vessel 14B, of the plate body 302 so as to face the left wall 14e of the heat treatment vessel 14B. For this reason, if the heat treatment vessels 14A and 14B adjacent in the orthogonal direction F2 are displaced relative to each other, the corner 14f of the heat treatment vessel 14A or 14B comes into abutment against a corresponding one of the pair of engagement protrusions 302b and 302c so that mutual displacement can properly be restricted between the heat treatment vessels 14A and 14B adjacent in the orthogonal direction F2.

Although the embodiments of the present invention have hereinbefore been described in detail based on the drawings, the present invention is applicable also to other modes.

Although, for example, in the coupler 18 of the first embodiment described above, the pair of first engagement protrusions 18c and 18d and the pair of second engagement protrusions 18e and 18f each protrude prismatically, for example, the pair of first engagement protrusions 18c and 18d and the pair of second engagement protrusions 18e and 18f may protrude cylindrically. That is, the pair of first engagement protrusions 18c and 18d and the pair of second engagement protrusions 18e and 18f may be of any shape as long as they can engage with corresponding ones of the corners 14h of the pair of heat treatment vessels 14A and 14B and the corners 14h of the pair of heat treatment vessels 14C and 14D. Although the conveying-direction gap forming portion 18i and the orthogonal-direction gap forming portion 18j of the spacer protrusion 18g are each a protrusion that extends prismatically, for example, the conveying-direction gap forming portion 18i and the orthogonal-direction gap forming portion 18j may each be a protrusion that extends cylindrically. That is, the conveying-direction gap forming portion 18i and the orthogonal-direction gap forming portion 18j may be of any shape as long as they can form the conveying-direction gap S1 and orthogonal-direction gap S2 between adjacent ones of the heat treatment vessels 14A to 14D.

Although the spacer protrusion 18g of the coupler 18 of the first embodiment described above has both the conveying-direction gap forming portion 18i and the orthogonal-direction gap forming portion 18j, for example, the spacer protrusion 18g may have only one of the conveying-direction gap forming portion 18i and the orthogonal-direction gap forming portion 18j. That is, circulation of atmosphere within the heat treatment furnace 12 can be restrained from deteriorating, due to the formation of either gap of the conveying-direction gap S1 and the orthogonal-direction gap S2 between adjacent ones of the heat treatment vessels 14A to 14D.

Although in the second embodiment described above, the pair of heat treatment vessels 14A and 14B are coupled together by the pair of first coupler 102 and second coupler 104, for example, the pair of heat treatment vessels 14A and 14B may be coupled together by only either coupler of the pair of first coupler 102 and the second coupler 104.

Although in the coupler 188 of the fifth to seventh embodiments described above, the pair of engagement protrusions 188b and 188c are each of a shape elongated in the conveying direction F1, for example, they may extend in a prismatic shape or a cylindrical shape. That is, the pair of engagement protrusions 188b and 188c may extend in any shape as long as the pair of engagement protrusions 188b and 188c are allowed to engage with the right wall 14d of the heat treatment vessel 14A and the left wall 14e of the heat treatment vessel 14B. Although the spacer protrusion 188d has a shape elongated in the conveying direction F1, similarly, it may extend in a prismatic shape or a cylindrical shape. That is, the spacer protrusion 188d may extend in any shape as long as the spacer protrusion 188d can be sandwiched between the right wall 14d of the heat treatment vessel 14A and the left wall 14e of the heat treatment vessel 14B.

Although in the coupler 202 of the eighth embodiment described above, the pair of engagement protrusions 202b and 202c each protrude in a prismatic shape, for example, the pair of engagement protrusions 202b and 202c may each extend in a cylindrical shape. That is, the pair of engagement protrusions 202b and 202c may extrude in any shape as long as the pair of engagement protrusions 202b and 202c can engage with the end of the right wall 14d of the heat treatment vessel 14A and the end of the left wall 14e of the heat treatment vessel 14B, i.e., as long as the pair of engagement protrusions 202b and 202c can engage with the corners 14f of the heat treatment vessels 14A and 14B. The misalignment prevention protrusion 202g and the spacer protrusion 302d need not necessarily be joined together.

Although in the eighth embodiment described above, the heat treatment vessels 14A and 14B are coupled together by the pair of couplers 202, for example, the heat treatment vessels 14A and 14B may be coupled together by only one coupler of the pair of couplers 202.

Although the coupler 188 shown in FIGS. 11 to 15 of the first to third embodiments described above couples together the heat treatment vessels 14A and 14B adjacent in the orthogonal direction F2, it may be used to couple together the heat treatment vessels 14 adjacent in the conveying direction F1.

It should be appreciated that the above are merely exemplary embodiments and that the present invention can be carried out in modes variously altered or modified based on the knowledge of those skilled in the art.

EXPLANATIONS OF LETTERS OR NUMERALS

10: material to be treated
12, 100: heat treatment furnace
14, 14A, 14B, 14C, 14D, 114: heat treatment vessel
14b: front wall (side wall)
14c: rear wall (side wall)
14d: right wall (side wall)
14e: left wall (side wall)
14h: corner
16: conveyor roller
18, 110: coupler
18b, 110a: plate body
18c, 18d, 110b, 110c: first engagement protrusion (engagement protrusion)
18e, 18f, 110d, 110e: second engagement protrusion (engagement protrusion)
18g, 110f: spacer protrusion
18i: conveying-direction gap forming portion
18j: orthogonal-direction gap forming portion
102: first coupler (coupler)
102a: plate body
102b, 102c: engagement protrusion
102d: spacer protrusion
104: second coupler (coupler)

104a: plate body
104b, 104c: engagement protrusion
104d: spacer protrusion
188, 202, 302: coupler
188a, 202a, 302a: plate body
188b, 188c, 202b, 202c, 302b, 302c: engagement protrusion
188d, 202d, 302d: spacer protrusion
202g: misalignment prevention protrusion
302e, 302f: side edge
F1: conveying direction
F2: orthogonal direction (direction)
S1: conveying-direction gap (gap)
S2: orthogonal-direction gap (gap)

The invention claimed is:

1. A heat treatment vessel coupler for coupling together heat treatment vessels adjacent in a horizontal direction, of a plurality of rectangular box-shaped heat treatment vessels each loaded with a material to be treated, conveyed in a conveying direction on a plurality of rotationally driven conveyor rollers arranged in parallel inside a heat treatment furnace, the coupler comprising:
   a plate body smaller than each of the heat treatment vessels;
   at least a pair of engagement protrusions each projecting from the plate body and engaging with a corresponding one of side walls of the heat treatment vessels; and
   a spacer protrusion projecting from the plate body between the at least a pair of engagement protrusions so as to be sandwiched between the heat treatment vessels with which the at least a pair of engagement protrusions engage respectively.

2. The heat treatment vessel coupler of claim 1, wherein the coupler couples mutually the heat treatment vessels adjacent in the conveying direction, of the plurality of rectangular box-shaped heat treatment vessels or couples mutually the heat treatment vessels adjacent in the conveying direction and mutually the heat treatment vessels adjacent in a direction orthogonal to the conveying direction, wherein
   at least a pair of engagement protrusions each engage with a corresponding one of corners defined between side walls of the heat treatment vessels, and wherein
   the spacer protrusion projects from the plate body between the at least a pair of engagement protrusions so as to be sandwiched between the corners defined between side walls of the heat treatment vessels with which the at least a pair of engagement protrusions engage respectively.

3. The heat treatment vessel coupler of claim 2, wherein the at least a pair of engagement protrusions include a total of four engagement protrusions, i.e., a pair of engagement protrusions each engaging with a corresponding one of corners defined between side walls of a pair of heat treatment vessels adjacent in the conveying direction and a pair of engagement protrusions each engaging with a corresponding one of corners defined between side walls of a pair of heat treatment vessels adjacent in a direction orthogonal to the conveying direction, and wherein
   the spacer protrusion projects from the plate body between the four engagement protrusions so as to be sandwiched between the pair of heat treatment vessels adjacent in the conveying direction and between the pair of heat treatment vessels adjacent in the direction orthogonal to the conveying direction.

4. The heat treatment vessel coupler of claim 3, wherein the spacer protrusion comprises: a conveying-direction gap forming portion intervening between heat treatment vessels adjacent in the conveying direction to form a gap therebetween; and an orthogonal-direction gap forming portion intervening between heat treatment vessels adjacent in a direction orthogonal to the conveying direction to form a gap therebetween.

5. The heat treatment vessel coupler of claim 4, wherein the conveying-direction gap forming portion is elongated in a direction orthogonal to the conveying direction, wherein
   the orthogonal-direction gap forming portion is elongated in the conveying direction, and wherein
   the spacer protrusion is a protrusion including the conveying-direction gap forming portion and the orthogonal-direction gap forming portion that intersect each other at right angles.

6. The heat treatment vessel coupler of claim 3, comprising:
   a misalignment prevention protrusion projecting on the plate body from a side edge not having the pair of engagement protrusions, of both side edges of the plate body, to a direction identical to a direction of projection of the pair of engagement protrusions, the misalignment prevention protrusion being positioned, with intervals greater than a thickness of the side walls of the heat treatment vessel, between the pair of engagement protrusions.

7. The heat treatment vessel coupler of claim 2, wherein the at least a pair of engagement protrusions include two engagement protrusions each engaging with a corresponding one of corners defined between side walls of a pair of heat treatment vessels adjacent in the conveying direction, wherein
   the spacer protrusion projects from the plate body between the two engagement protrusions so as to be sandwiched between the pair of heat treatment vessels adjacent in the conveying direction.

8. The heat treatment vessel coupler of claim 1, wherein the coupler couples mutually heat treatment vessels adjacent in a direction orthogonal to the conveying direction, of the rectangular box-shaped heat treatment vessels, wherein
   the pair of engagement protrusions project integrally from the plate body and engage respectively with one side wall, lying toward a heat treatment vessel on the other hand, of side walls of a heat treatment vessel on one hand, of the heat treatment vessels adjacent in the orthogonal direction and with the other side wall, facing the one side wall, of side walls of a heat treatment vessel on the other hand, of the heat treatment vessels adjacent in the orthogonal direction, and wherein
   the spacer protrusion project from the plate body between the pair of engagement protrusions so as to be sandwiched between the one side wall and the other side wall.

9. The heat treatment vessel coupler of claim 8, wherein the pair of engagement protrusions and the spacer protrusion are elongated in the conveying direction and are parallel to one another.

10. The heat treatment vessel coupler of claim 8, wherein the pair of engagement protrusions engage with an end of the one side wall and an end of the other side wall, respectively.

11. The heat treatment vessel coupler of claim 8, wherein in a state where the coupler couples adjacent vessels together,
the plate body is an elongated plate extending along the one side wall and the other side wall,
one of the pair of engagement protrusions being a longitudinal protrusion projecting from a side edge, lying toward the heat treatment vessel on one hand, of the elongated plate, so as to face the one side wall,
the other of the pair of engagement protrusions being a longitudinal protrusion projecting from a side edge, lying toward the heat treatment vessel on the other hand, of the elongated plate, so as to face the other side wall.

12. A heat treatment vessel coupling method of coupling mutually, by use of a coupler, heat treatment vessels adjacent in a conveying direction or heat treatment vessels adjacent in an orthogonal direction orthogonal to the conveying direction, of rectangular box-shaped heat treatment vessels each loaded with a material to be treated, conveyed on a plurality of rotationally driven conveyor rollers arranged in parallel inside a heat treatment furnace, the coupler comprising:
a plate body smaller than each of the heat treatment vessels;
a pair of engagement protrusions projecting integrally from the plate body and engaging respectively with one side wall, lying toward a heat treatment vessel on the other hand, of side walls of a heat treatment vessel on one hand, of heat treatment vessels adjacent in the conveying direction or the orthogonal direction and with the other side wall, facing the one side wall, of side walls of the heat treatment vessel on the other hand, of the heat treatment vessels adjacent in the conveying direction or the orthogonal direction, and
a spacer protrusion projecting from the plate body between the pair of engagement protrusions so as to be sandwiched between the one side wall and the other side wall.

13. A heat treatment method using a heat treatment vessel coupler, the coupler coupling mutually, heat treatment vessels adjacent in a conveying direction of the heat treatment vessels or heat treatment vessels adjacent in an orthogonal direction orthogonal to the conveying direction, of rectangular box-shaped heat treatment vessels each loaded with a material to be treated, conveyed on a plurality of rotationally driven conveyor rollers arranged in parallel inside a heat treatment furnace, the coupler comprising:
a plate body smaller than each of the heat treatment vessels;
a pair of engagement protrusions projecting integrally from the plate body and engaging respectively with one side wall, lying toward a heat treatment vessel on the other hand, of side walls of a heat treatment vessel on one hand, of heat treatment vessels adjacent in the conveying direction or the orthogonal direction and with the other side wall, facing the one side wall, of side walls of the heat treatment vessel on the other hand, of the heat treatment vessels adjacent in the conveying direction or the orthogonal direction, and
a spacer protrusion projecting from the plate body between the pair of engagement protrusions so as to be sandwiched between the one side wall and the other side wall.

\* \* \* \* \*